(12) United States Patent
Nakagome

(10) Patent No.: US 8,040,462 B2
(45) Date of Patent: Oct. 18, 2011

(54) LIQUID CRYSTAL DISPLAY DEVICE

(75) Inventor: Tomohiro Nakagome, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 12/988,261

(22) PCT Filed: Apr. 17, 2008

(86) PCT No.: PCT/JP2008/057547
§ 371 (c)(1),
(2), (4) Date: Jan. 6, 2011

(87) PCT Pub. No.: WO2009/128164
PCT Pub. Date: Oct. 22, 2009

(65) Prior Publication Data
US 2011/0090425 A1    Apr. 21, 2011

(51) Int. Cl.
*G02F 1/1335* (2006.01)
(52) U.S. Cl. .......... 349/64; 349/61; 349/62; 349/65; 349/94; 349/57; 359/618; 359/619; 359/620
(58) Field of Classification Search .......... 349/57, 349/61–65; 359/618–620
See application file for complete search history.

(56) References Cited

U.S. PATENT DOCUMENTS

| | | | |
|---|---|---|---|
| 6,822,707 B2 * | 11/2004 | Ariyoshi et al. | 349/112 |
| 6,897,911 B2 * | 5/2005 | Yamaguchi | 349/57 |
| 7,726,865 B2 * | 6/2010 | Sato et al. | 362/620 |

FOREIGN PATENT DOCUMENTS

| | | |
|---|---|---|
| JP | 07-168282 | 7/1995 |
| JP | 2002-318425 | 10/2002 |
| JP | 2006-024519 | 1/2006 |
| JP | 2006-162846 | 6/2006 |
| JP | 2006-195276 | 7/2006 |
| JP | 2007-012517 | 1/2007 |
| JP | 2007-103321 | 4/2007 |
| JP | 2007-213035 | 8/2007 |
| JP | 2007-304433 | 11/2007 |
| JP | 2008-003233 | 1/2008 |

* cited by examiner

*Primary Examiner* — Huyen Ngo
(74) *Attorney, Agent, or Firm* — Squire, Sanders & Dempsey (US) LLP

(57) ABSTRACT

The present invention can provide an optical device, an optical uniform device, an optical sheet and a backlight unit and a display apparatus. In the present invention, a lamp image can be removed by uniformly emitting incident light from a plurality of light sources. Further, even if a distance between a light source and an optical device and between a light source and an optical uniform device are short, warpage due to heat generated from a light source does not occur.

3 Claims, 44 Drawing Sheets

US 8,040,462 B2

LIQUID CRYSTAL DISPLAY DEVICE

CROSS-REFERENCE TO RELATED APPLICATIONS

This is a national stage entry of PCT Application No. PCT/JP2008/057547, filed Apr. 17, 2008, which is incorporated herein by reference in its entirety.

TECHNICAL FIELD

The present invention is related to an optical device, an optical uniform device, an optical sheet, a backlight unit and a display device, used for controlling a path of illuminating light. In particular, the present invention is related to an optical device, an optical uniform device, an optical sheet, a backlight unit and a display device, used for controlling a path of illuminating light in an image display device such as a flat panel display.

BACKGROUND TECHNIQUE

In a recent large scale liquid crystal display, a direct-lit type backlight has been adopted, wherein a plurality of Cold Cathode Fluorescent Lamp (CCFLs) or LEDs (Light Emitting Diode) are arranged. A diffusion plate having strong light scattering properties is used between an image display device and a light source so that CCFLs or LEDs can not be visually recognized. A diffusion plate diffuses light in all directions by a light diffusion effect darkening a liquid crystal display device. In addition, a plate thickness of a diffusion plate is usually required to be 1-5 mm in order that light scattering properties are improved and the diffusion plate supports an optical film arranged on the diffusion plate. Therefore, light is absorbed by a diffusion plate, and a liquid crystal screen display is darkened.

In addition, year by year, liquid crystal televisions are becoming thinner. Thereby, a diffusion plate also becomes thin and further improvement of diffusion property is required.

Conventionally, the purpose of a diffusion plate used for a direct-lit type backlight is to diffuse light from a CCFL of a light source and to reduce brightness non-uniformity (a lamp image). However, it is difficult to perfectly remove the lamp image.

In the case where diffusion particles are increased too much in order to perfectly remove the lamp image, Total Luminous Transmittance is significantly reduced causing a reduction in brightness. In addition, if diffusion particles of a diffusion plate are reduced in order not to reduce Total Luminous Transmittance, a diffusion effect is also reduced.

In patent documents 1-3, an example is disclosed as a means for improving diffusion performance. In the example, a lens shape is provided to a light outgoing surface of a diffusion plate. For example, a lens having a convex curved surface is arranged on a diffusion plate. In such a diffusion plate, it may be necessary that a shape of a lens is designed so as to correspond to an arrangement of a light source, and determine the alignment of the lens. Therefore, a manufacturing process may become complex. In addition, if a lens shape is provided to a light outgoing surface of a diffusion plate, Total Luminous transmittance of a diffusion plate may be reduced, thereby a liquid crystal display screen may be darkened. Further, a lens sheet arranged on a diffusion plate and a liquid crystal pixel may cause moire interference.

As means to improve brightness of a liquid crystal display screen, a brightness improving film (Brightness Enhancement Film: BEF, a registered mark of 3M (Amerika)) is broadly used as a lens sheet. FIG. 17 is a schematic cross sectional diagram showing one example of the arrangement of a BEF. FIG. 18 is a perspective view of a BEF. As shown in FIGS. 17 and 18, BEF 185 is an optical film in which a unit prism 187 having a triangle cross sectional shape is periodically arranged in one direction on a member 186. This unit prism 187 has a large size (pitch) compared with a wavelength of light.

BEF 185 collects light from "off-axis", and can redirect or recycle this light "on-axis" toward a viewer. That is, BEF 185 can increase brightness on an axis by reducing brightness off an axis when a display is used (viewed). Here, "on axis" is a direction corresponding to a view field direction F of a viewer, and, in general, is the side of a direction of a normal line of a display screen.

However, in the case where BEF 185 is used, the light component due to reflection/refraction may simultaneously be emitted toward a lateral direction without progressing towards a viewing direction F of a viewer. Line B in FIG. 19 shows the characteristics of BEF 185. Light intensity in a direction on axis (the angle to a view field direction F' is 0°) is increased the most. However, there is a small light intensity peak (side lobe) around 90° (the angle to a direction F' is 90°). Light emitted in a lateral direction is increased without progressing to a viewer.

In the case where a lens sheet represented by a BEF 185 is used, a diffusion filler is applied to a transparent base material, a diffusion film (hereinafter, called "an under diffusion film") having both functions of diffusion and light collection is arranged between a diffusion plate and a lens sheet, thereby diffusion light emitted from a diffusion plate is effectively collected while visibility of a light source which can not be perfectly removed just by a diffusion plate can be controlled.

Further, in the case where a light diffusion film is arranged between a lens sheet and a liquid crystal panel, a side lobe can be reduced while moire interference occurring between a regularly arranged lens and a liquid crystal pixel can be prevented. However, in a type using an under diffusion film and a light diffusion film, the number of components is increased, thereby processes in manufacturing a display become complex and dust becomes mixed between optical sheets.

In patent document 4, the following are disclosed as a means for solving such a problem. Without using an optical film comprised only of the unit prism, an optical film having an array structure in which a unit lens is arranged in a two dimensional direction with a constant pitch is used for a backlight unit. The optical characteristics of this optical film are shown by the line A in FIG. 19, a side lobe is not shown, and light intensity in a viewing field direction F' is improved more than a line B.

However, in a backlight unit using such an optical film, because it is necessary that a light outgoing surface of a diffusion plate is flat in order to laminate an optical film to form one body, it was difficult to improve a diffusion effect and a light collecting effect by providing a light outgoing surface of a diffusion plate with a lens.

Patent document 1: JP-A-2007-103321
Patent document 2: JP-A-2007-12517
Patent document 3: JP-A-2006-195276
Patent document 4: JP-A-2007-213035

SUMMARY OF THE INVENTION

The present invention attempts to solve the problems described above. In the present invention, a lamp image can be reduced/removed by making the incident light from a plurality of light sources uniform and emitting the light. In addition, even if a distance between a light source and an optical device and a distance between a light source and an optical uniform device are short, an optical device and an optical uniform device in which warpage due to heat generated from a light source is prevented are provided. Another purpose of the present invention is to provide an optical sheet, a backlight unit with the optical sheet and a display device. In the optical sheet, an optical film improving brightness toward an observer side by making light from an optical device and an optical uniform device efficiently progress toward an observer side is laminated with the optical device and the optical uniform device to make one body.

The present invention includes the structure described below in order to solve the problems described above.

That is, the invention in claim 1 is a liquid crystal display device comprising:
- a line shaped light source; and
- an optical uniformity device comprising:
  - a light deflection lens having a lens shape of a lenticular type, wherein, in planar view, an angle between a direction of a long axis of the light deflection lens and a direction of a long axis of the line shaped light source is equal to or less than 20 degrees;
  - a light propagation layer located at a light outgoing surface side of the light deflection lens, wherein light deflected by the light deflection lens enters into the light propagation layer; and
  - a light diffusion base arranged at the light outgoing surface side of the light propagation layer,
- wherein
  - the light deflection lens comprises a top part and a slope part, where the slope part is from the top part onto a surface of the light propagation layer on a side of the line shaped light source,
  - the top part comprises an arc or a tip that forms a ridge line of which a curvature radius is smaller than a curvature radius along the slope part, and
  - a thickness T of the light propagation layer satisfies the following formula 1, and
- wherein
  - n is the refractive index of the light propagation layer,
  - P is the pitch of the light deflection lens, and
  - θ is an angle between
    - a tangential line to the slope part at a junction point to the light propagation layer, and
    - the surface of the light propagation layer on the side of the line shaped light source.

$$T > P \times \tan\left\{\operatorname{Sin}^{-1}\left(\frac{1}{n}\sin\theta\right) + \operatorname{Cos}^{-1}(\sin\theta)\right\} (10\ \mu m \leq P \leq 300\ \mu m) \quad \text{(formula 1)}$$

The invention in claim 2 is the liquid crystal display device according to claim 1,
wherein, regarding the optical uniformity device,
the light diffusion base is formed by a light diffusion region dispersed in a transparent resin, the light diffusion base having a total luminance transmittance value within 30% to 80% and a haze value equal to or greater than 95%; and
the light propagation layer has a total luminance transmittance value equal to or greater than 80%, and a haze value equal to or less than 95%.

The invention in claim 3 is the liquid crystal display device according to claim 1,
wherein, regarding the light deflection lens,
the slope part has a curved shape that includes a curved slope part,
an angle between
a tangential line at each point of the curved slope art and
the surface of the light propagation layer on the side of the line shaped light source
is within 20 to 90 degrees, and
the angle, between the tangential line at each point and the surface of the light propagation layer, changes continuously.

BRIEF DESCRIPTION OF THE DRAWINGS

FIG. 2(*b*) is a diagram explaining formula 1.

FIG. 2(*c*) is a diagram explaining formula 2.

FIG. 3(*b*) is a diagram showing an example of a shape of a lens of an optical deflection element.

FIG. 3(*c*) is a diagram showing an example of a shape of a lens of an optical deflection element.

FIG. 3(*d*) is a diagram showing an example of a shape of a lens of an optical deflection element.

FIG. 3(*e*) is a diagram showing an example of a shape of a lens of an optical deflection element.

FIG. 3(*f*) is a diagram showing an example of a shape of a lens of an optical deflection element.

FIG. 4(*b*) is a diagram showing an effect of light diffusion of a light diffusion/reflection layer.

FIG. 5(*b*) is a diagram showing an example in which a light diffusion/reflection layer is formed at a first top part of a light deflection element.

FIG. 5(*c*) is a diagram showing an example in which a light diffusion/reflection layer is formed at a first top part of a light deflection element.

FIG. 5(*d*) is a diagram explaining an amount of an over area toward a first slope surface in the case where a light diffusion/reflection layer is formed on a top part of a light deflection element.

FIG. 6(*b*) is a diagram showing an example of a shape of a lens of a light deflection element.

FIG. 6(*c*) is a diagram showing an example in which a light diffusion/reflection layer is formed at a first top part of a light deflection element.

FIG. 6(*d*) is a diagram showing an example in which a light diffusion/reflection layer is formed at a convex part of a light deflection element.

FIG. 7(*b*) is a diagram explaining formula 2 in the case where a light deflection element is a convex lens.

A . . . distribution of light intensity of BEF;
B . . . distribution of light intensity of an optical film;
H,K . . . light;
P . . . a pitch of a first slope surface of a light deflection element;
m . . . tangential line;
T . . . a thickness of a light propagation layer;
$\theta$ . . . an angle between one surface of a light propagation layer and a tangential line m;
$\theta 1$, $\theta 2$ and $\theta 3$ . . . an angle between one surface of a light propagation layer and a tangential line at each point of a light deflection element;
n . . . a refractive index of a light propagation layer;
n0 . . . a refractive index of a light deflection element;
n1 . . . a refractive index of a first layer of a light propagation layer;
n2 . . . a refractive index of a second layer of a light propagation layer;
F and F' . . . an observer side;
X . . . a direction of a planar view;
Ve . . . a perpendicular direction of an image display device;
Ho . . . a horizontal direction of an image display device;
$\theta 41$ . . . an angle between an axis direction k of a line shaped light source and an axis direction j of a lenticular type lens;
$\Delta$ . . . an amount of an over area of a light diffusion/reflection layer;
$\alpha$ . . . a farthest focus point;
1 . . . an optical film;
2 . . . an optical component;
13 . . . a valley part;
16 . . . a light collecting lens;
16a . . . a third top part;
16b . . . a third slope surface;
17 . . . a light transmission base;
17a . . . a surface of an opposite side to an observer;
17b . . . a surface of an observer side (a flat surface);
20 . . . a fixing layer;
21 . . . a light diffusion lens;
21a . . . a second top part;
21b . . . a second slope surface;
22 . . . a light mask;
23 . . . a light propagation layer;
23a . . . a surface of an opposite side to an observer;
23b . . . a surface of an observer side;
23A . . . a layer of a light deflection element side of a light propagation layer;
23B . . . a layer of a diffusion base material side of a light propagation layer;
24 . . . an optical device;
25 . . . an optical uniform device;
26 . . . a diffusion base;
26a . . . a surface of an opposite side to an observer;
26b . . . a surface of an observer side;
28 . . . a light deflection element;
28a . . . a first top part;
28b . . . a first slope part;
28c . . . a light diffusion/reflection layer;
29. . . *a fixing element (a rib);*
30 . . . a connection point;
31 and 33 . . . a polarizing plate;
32 . . . a liquid crystal panel;
35 . . . an image display device;
41 . . . a light source;
43 . . . a reflection plate (a reflection film);
45 . . . a backlight part;]
52 . . . an optical sheet;
55 and 56 . . . a backlight unit;
70 and 72 . . . a display device;
100 . . . an air layer;
182 . . . an under diffusion film;
184 . . . a light diffusion film;
185 . . . a BEF;
186 . . . a transparent component;
187 . . . a unit prism.

DETAILED DESCRIPTION OF THE INVENTION

Figure 1:
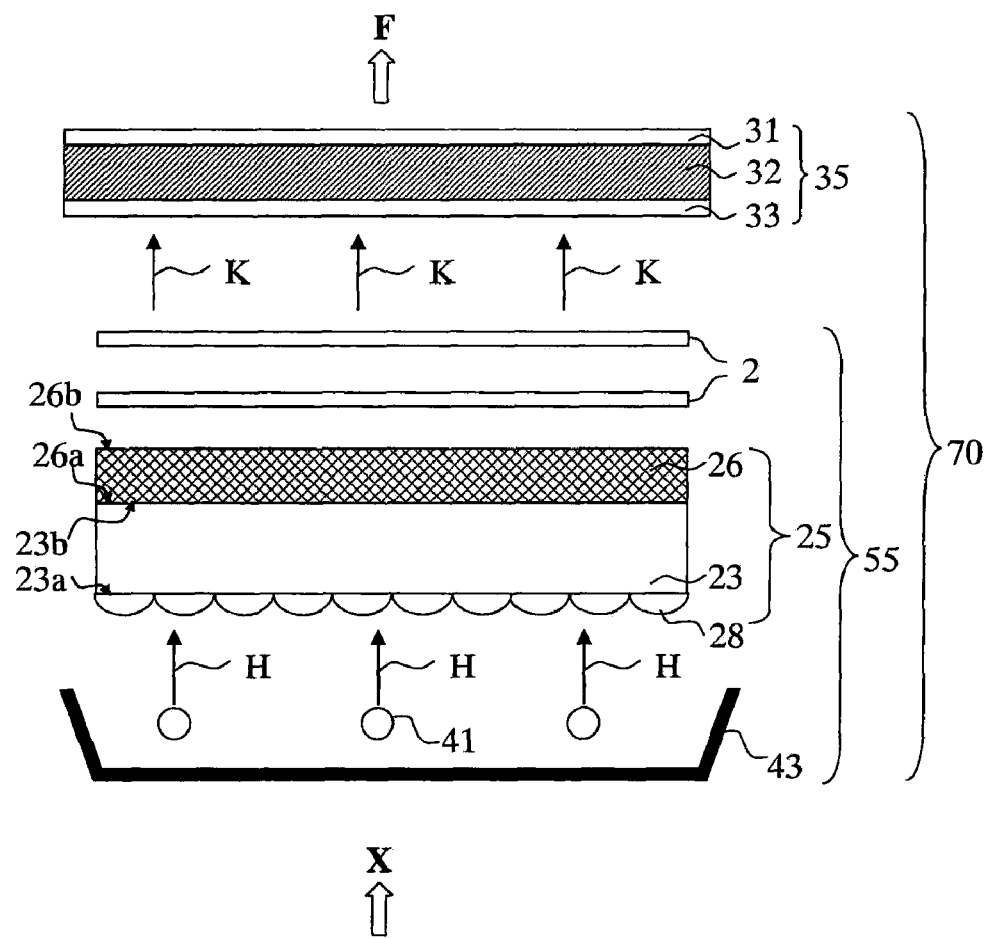
FIG. 1 is a schematic cross sectional diagram of a display device of an embodiment of the present invention.

FIG. 1 is a schematic cross sectional view showing an example of an optical device, an optical uniform device, a backlight unit and a display device. A display device 70 of one embodiment of the present invention is comprised of an image display device 35 and a backlight unit 55. In addition, in the backlight unit 55 of an embodiment of the present invention, a plurality of light sources are arranged inside a lamp house (a reflection plate) 43, one or a plurality of an optical devices, an optical uniform device 25, and an optical component 2 is arranged on the lamp house (observer side F direction). Light H emitted from a light source 41 is diffused by an optical uniform device 25. Thereafter, light H is diffused/reflected/collected/color-shifted by one or a plurality of optical components. Light K emitted from the backlight unit 55 enters the image display device 35. Then, light is emitted toward an observer side F.

The light source 41 supplies light to the image display device 35. Here, for example, a plurality of line-shaped light sources can be used as the light source 41. For example, a plurality of a fluorescence lights, a cold-cathode fluorescent lamp (CCFL), EEFL or a LED arranged as line shape can be used as the plurality of line-shaped light sources.

The reflection plate 43 is arranged at an opposite side to an observer side F of a plurality of light sources 41. Light is emitted in all directions from the light sources 41. Light emitted in a direction of an opposite side to an observer side F among the light emitted in all directions can be reflected and emitted toward an observer side F. As a result, light H emitted toward an observer side F is almost the same as the light emitted in all directions from the light sources 41. As mentioned above, by using a reflection plate 43, the usage efficiency of light can be increased. Any reflection plate 43 can be used as long as component reflecting light with high efficiency is used. For example, a general reflection film, a general reflection plate or the like can be used.

An optical device 24 of an embodiment of the present invention is comprised of a light deflection element 28 and a light propagation layer 23. In addition, a light deflection element 28 is arranged so as to face a side of a light source 41 of a display device 70. The function of the optical device 24 is to deflect light H emitted from a surface of the light deflection element 28, to allow the light to travel to a light propagation layer and to allow diffusion light to be emitted from a light outgoing surface of the light propagation layer 23. In addition, an optical uniform device 25 has a diffusion base 26 on the optical device 24. In the optical uniform device 25, a surface 26a of an opposite side to an observer side F of diffusion base 26 is arranged on a surface 23b of an observer side F of the light propagation layer 23. The above mentioned optical device 24 and optical uniform device 25 can be used for various applications such as a rear projection screen, a solar cell, an organic or inorganic EL and an illumination device as long as the light path is controlled in the application.

Figure 2A:
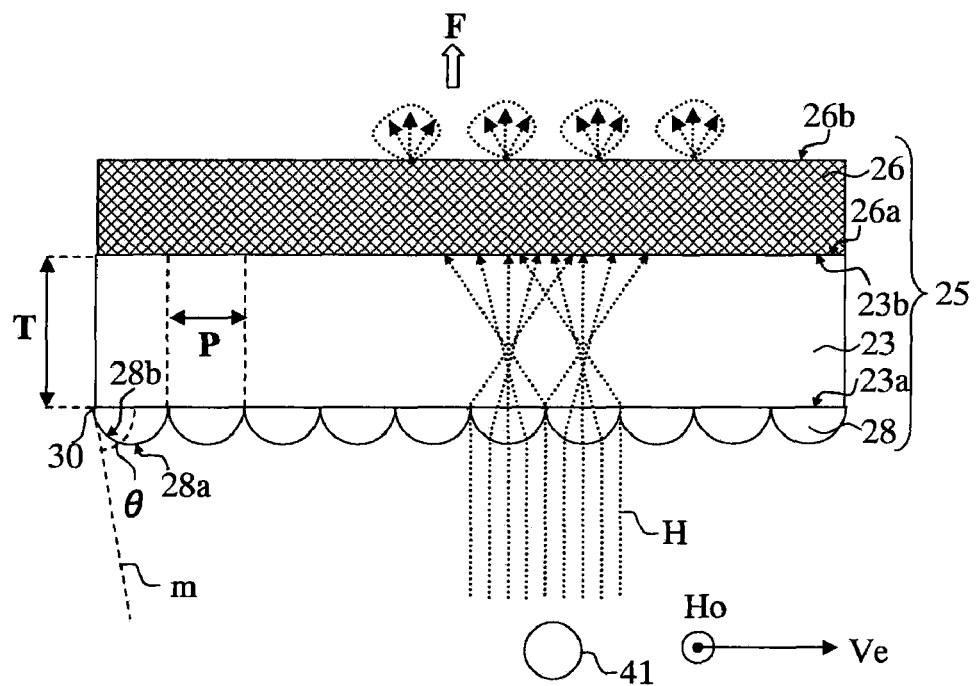
FIG. 2(*a*) is a schematic cross sectional diagram of an optical uniform device of an embodiment of the present invention.

FIG. 2(a) is a diagram explaining a function of the optical uniform device 25 of an embodiment of the present invention. Light sources 41 are arranged inside the lamp house (a reflection plate) 43 and are arranged in a direction Ve (screen vertical direction) with a constant pitch. Light H emitted from the light source 41 enters a surface of an opposite side to an observer side F of the optical uniform device 25, that is, light H enters from the light deflection element 28. Light H is emitted from a surface of an observer side F of the optical uniform device 25, that is, from a surface 26b of an observer side F of the diffusion base 26, toward an observer side F. In the case where diffusion performance of the optical uniform device 25 is insufficient in a surface 26a of an observer side F of the diffusion base 26, a region facing the light source 41 is bright, and a region facing a part between a pair of light sources 41 is dark. Therefore, non-uniform brightness (an image of a light source) is visually recognized. In the optical uniform device 25 of an embodiment of the present invention, the light deflection element 28 is arranged on a surface of an opposite side of an observer side F. A traveling direction of strong front light H emitted from a light source 41 is deflected by the light deflection element 28. Emitted light which is deflected is broadened by the light propagation layer 23. Diffusion is performed by the diffusion base 26. Uniform light is emitted toward an observer side F.

A lens having a convex-concave shape is preferable as the light deflection element 28, Preferably, in the case where an angle between a tangential line m to a first slope surface at a point 30 in which a first slope surface 28b of the light deflection element 28 connects with the light propagation layer 23 and a surface 23a of an opposite side to an observer side F of the light propagation layer 23 is θ, a pitch of a unit lens of the light deflection element 28 is P, a thickness of the light propagation layer 23 is T, and a refractive index of the light propagation layer 23 is n, the following formula 1 is preferably satisfied.

$$T \geq P \times \tan\left\{\operatorname{Sin}^{-1}\left(\frac{1}{n}\sin\theta\right) + \operatorname{Cos}^{-1}(\sin\theta)\right\} (10 \ \mu m \leq P \leq 300 \ \mu m)$$ [formula 1]

Figure 2B:
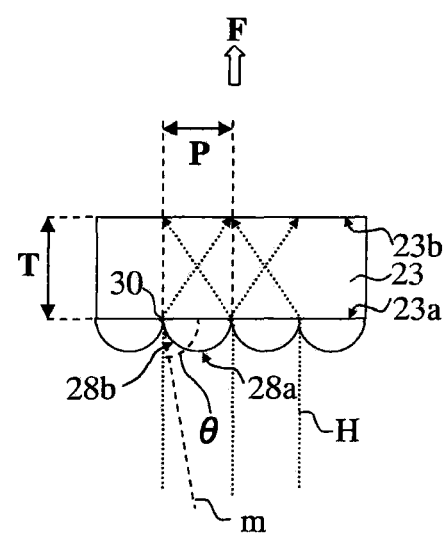
Figure 2:
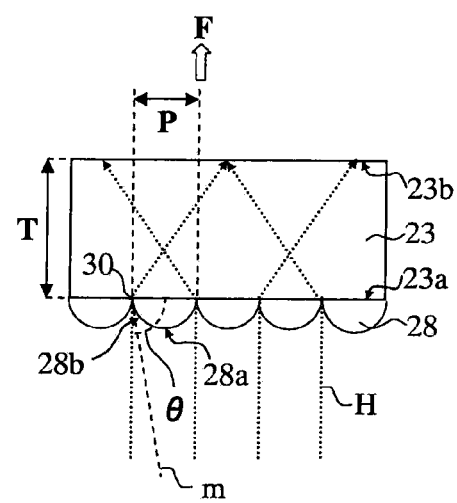

That is, as shown in FIG. 2(b), a thickness T of the light propagation layer 23 is defined as a necessary thickness such that light emitted to a point 30 where a first slope surface 28b of the light deflection element 28 connects with the light propagation layer 23 is deflected by an angle θ, and, in light propagation layer 23, the light is broadened to be equal to or more than a pitch of the light deflection element 28 in Ve direction.

Here, a pitch P of a unit lens of the light deflection element 28 is defined as a distance between two points connecting with the light propagation layer 23, when a cross section of the light deflection element 28 is viewed. In addition, a pitch P where formula 1 is effective is preferably equal to or more than 10 μm and equal to or less than 300 μm. In the case where a pitch P of the light deflection element 28 is less than 10 μm, a structural cycle approaches a wavelength and the influence of diffraction can not be ignored. In the case where a pitch P of the light deflection element 28 is more than 300 μm, a problem related to performance does not arise, however a thickness of the light propagation layer 23 becomes very thick. In this case, it is preferable that a thickness of the light propagation layer 23 is adjusted so as to be equal to or less than 2 mm.

That is, front light H emitted to the light deflection element 28 arranged with a constant pitch is deflected by the light deflection element 28, and light deflected by light deflection elements 28 adjacent to each other is mixed in the light propagation layer 23. Diffusion is performed in the diffusion base 26, thereafter light is emitted toward an observer side F. In the case where a thickness of the light propagation layer 23 does not satisfy formula 1, light deflected by the light deflection element 28 is not mixed, and is emitted to the diffusion base 26. Therefore, diffusion performance of the optical uniform device 25 is insufficient.

Further, light deflected by a first element of the light deflection element 28 and light deflected by a third element of the light deflection element 28 (that is, light deflected by two elements of the light deflection element 28, only one element being between the two elements) is preferably mixed. That is, following formula 2 is preferably satisfied.

$$T \geq 1.5P \times \tan\left\{\operatorname{Sin}^{-1}\left(\frac{1}{n}\sin\theta\right) + \operatorname{Cos}^{-1}(\sin\theta)\right\}$$ (formula 2)

$$(10 \ \mu m \leq P \leq 300 \ \mu m)$$

As shown in FIG. 2(c), where T is such that light deflected by two elements of the light deflection element 28, only one element being between the two elements, is mixed inside the light propagation layer 23 and its diffusion performance is further increased. Therefore, even if the distance to the light source 41 is near, that is, equal to or less than 10 μm, an image of a lamp can be reduced or be removed.

Figure 3A:
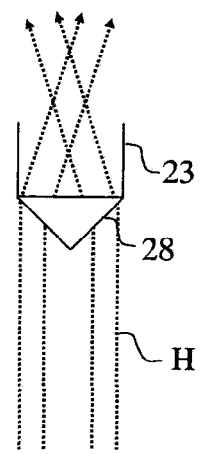
FIG. 3(*a*) is a diagram showing an example of a shape of a lens of an optical deflection element.
Figure 3B:
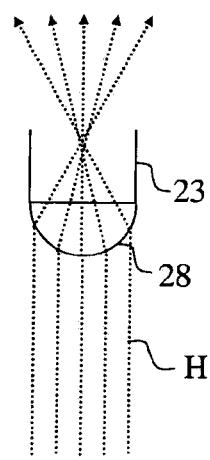
Figure 3C:
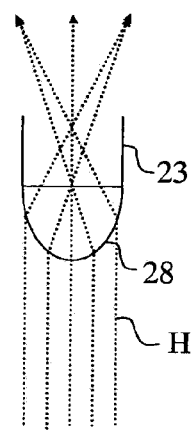
Figure 3D:
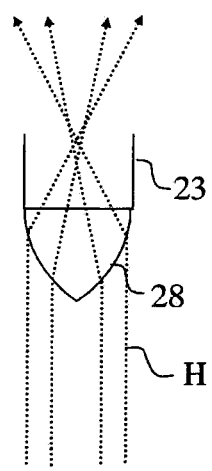

A triangle prism shape shown in FIG. 3(a) is desirable as the light deflection element 28. This is because shaping a lens is easy and light H emitted from the front can be largely deflected. In addition, a convex curved lens shape shown in FIG. 3(b) is desirable. A tangential line to a first top part 28a and each point of a first slope surface 28b changes continuously, therefore light H emitted from the front can be deflected in various directions. The non-sphere shape shown in FIG. 3(c) is more desirable as a convex curved lens shape. Since the curvature radius of a first top part 28a can be made small, diffusion performance can be increased. Further, the curved triangle prism shown in FIG. 3(d) is desirable as a light deflection lens shape 28. Since a first top part 28a is a ridge line, even if emitted light H enters any point of a lens, the light can always be largely deflected. In addition, since a tangential line to a first slope surface 28b at each point changes continuously, light H emitted from the front can be diffused in various directions. At this time, an angle between a tangential line to a first slope surface 28b at each point and a surface 23b of an opposite side to an observer side F of the light propagation layer 23 changes continuously between 20 degrees and 90 degrees, which is desirable. In the case where there is a surface in which the angle is less than 20 degrees, since the deflection angle becomes very small, diffusion performance becomes very weak. Especially, in the case where there is a surface in which the angle is 0 degrees, emitted light H passes through while deflection does not occur at all. In a curved triangle prism, there is no surface where an angle between a tangential line to a first slope surface 28b at each point and a surface 23b of an opposite side to an observer side of the light propagation layer 23 is less than 20 degrees. Therefore, even if light enters any point of a first slope surface 28b, deflection at a large angle is possible.

In addition, in the case where an angle between a tangential line to a first slope surface 28b at each point and a surface 23b of an opposite side to an observer side F of the light propagation layer 23 does not largely change, even if light enters any point of a first slope surface 28b, a deflection angle becomes almost identical and light is collected in an identical region. In a curved triangle prism, an angle between a tangential line to a first slope surface 28b at each point and a surface 23b of an opposite side to an observer side F of a light propagation layer 23 largely changes between 20 degrees and 90 degrees. Therefore, emitted light (incident light) H can be deflected in various directions, and light can be uniform.

Figure 3E:
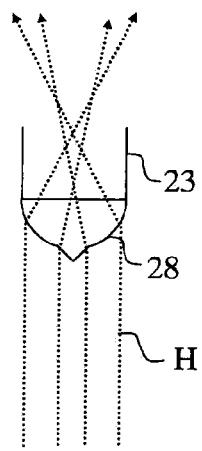
Figure 3F:
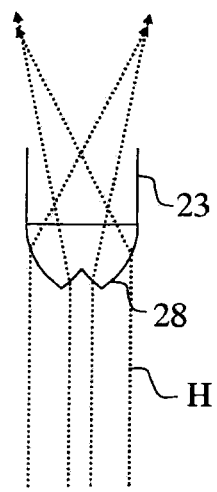

In addition, the light deflection element 28 can be used by combining the above mentioned plural lens shapes. For example, as shown in FIG. 3(e), a shape of a combination where a triangle prism is arranged above a convex curved lens can be used. In addition, as shown FIG. 3(f), a shape of two curved triangle prisms overlapping each other, one shifted in the Ve direction from the other, can be used. The diffusion effect due to a shape of two or more lenses allows diffusion performance to be increased.

The light deflection element 28 can have a light cover layer above a first top part 28a, the light cover layer diffusing and reflecting light H from the light source 41.

Figure 4A:
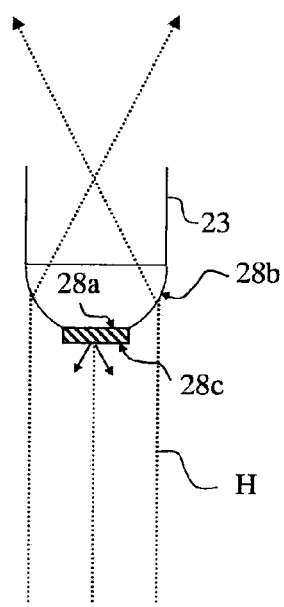
FIG. 4(*a*) is a diagram showing an effect of light reflection of a light diffusion/reflection layer.
Figure 4B:
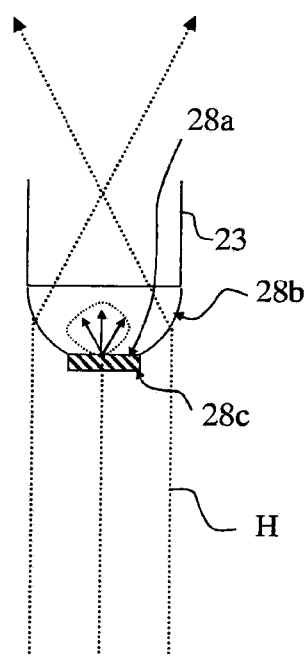
Figure 5A:
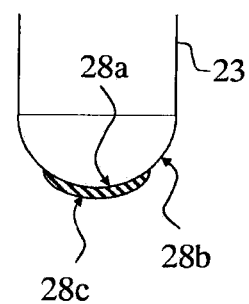
FIG. 5(*a*) is a diagram showing an example in which a light diffusion/reflection layer is formed at a first top part of a light deflection element.

FIG. 4(a) is a diagram showing an effect of light reflection of a light cover layer 28c. For example, when the light cover layer 28c is formed on a first top part 28a of a convex curved lens, a region of a small deflection angle among a light deflection element 28 reflects incident light, thereby only a region of a large deflection angle can be selected, which increases diffusion performance. At this time, it is desirable that an angle between a tangential line to a first slope surface at each point and a surface 23b of an opposite side to an observer side of the light propagation layer 23 is 20-90 degrees, and angle between a tangential line to a first top part 28a at each point and a surface 23a of an opposite side to an observer side F of the light propagation layer 23 is 0-40 degrees, which is further desirable. FIG. 4(b) is a diagram showing an effect of light diffusion of a light cover layer 28c. For example, if the light cover layer 28c is formed on a first top part 28a of a convex curved lens, light incident to a region of a small deflection angle among the light deflection element 28 is diffused. Thereby, diffusion performance can be increased. FIG. 5(a) shows a case where a light cover layer 28c is formed on a first top part 28a of a convex curved lens. A light cover layer 28c can be curved along a curved first top part 28a.

Figure 5B:
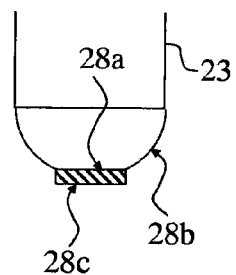
Figure 5C:
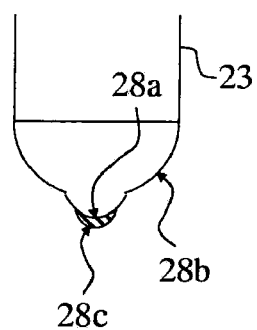
Figure 5D:
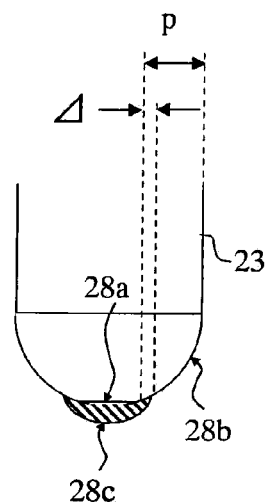

For example, as shown in FIG. 5(b) a first top part 28a can be almost flat in order that a light cover layer 28c is easily formed on a first top part 28a. In addition, as shown in FIG. 5(c), a first top part 28a is shaped to be a convex, and a light cover layer 28c can be formed on the convex. A light cover layer 28c, considering its performance, can have an over area at a first slope surface 28b, as shown in FIG. 5(b). However, if a large part of a first slope surface 28b is covered, a diffusion function of the light deflection element 28 is reduced. Therefore, it is preferable that an over area Δ is equal to or less than 30% based on a width p1 of a first slope surface 28b. Here, an example in which a light cover layer 28c is formed on a first top part 28a of a convex curved lens is exemplified. However, the embodiment is not limited to this, and the embodiment includes a case where a light cover layer 28c is formed on a first top part 28a of the triangle prism shape, the curved triangle prism shape, the combined lens or the like.

Here, for example, a light diffusion/reflection layer comprised of a white pigment or the like is exemplified as a light cover layer 28c. Here, titanic oxide, aluminum oxide, barium sulfate or the like is exemplified as a white pigment. A formation method is a coating, a printing method or the like. Further, in addition, a metal thin film or the like can be formed by vapor deposition, pressure bonding or the like.

Further, in addition, a light cover layer 28c may include a fluorescence material. Light emitted from a light source 41 includes a small ray of ultraviolet light. Therefore, for example, in the case of a backlight having a structure in which a diffusion plate, a prism sheet and a diffusion sheet are arranged above a light source 41 in this order ("above" shows a direction of an observer side.), the diffusion plate located at a nearest position to the light source 41 includes a ultraviolet light absorber. In this structure, since a light cover layer 28c is formed on a first top part 28a of a light deflection element 28, a light cover layer 28c is located at a nearest position to the light source 41. Therefore, ultraviolet light included in the light source 41 makes a fluorescence material emit light, thereby ultraviolet light can be efficiently utilized to increase a ray of light of an entire backlight. In addition, incident ultraviolet light from a first slope surface 28b is absorbed by an ultraviolet light absorber included in any of the light deflection element 28, light propagation layer 23 and diffusion base 26. Therefore, ultraviolet light never leaks towards an observer side F. Here, any material can be used as a fluorescence material as long as the fluorescence is generally used for an optical application such as a white LED.

Figure 6A:
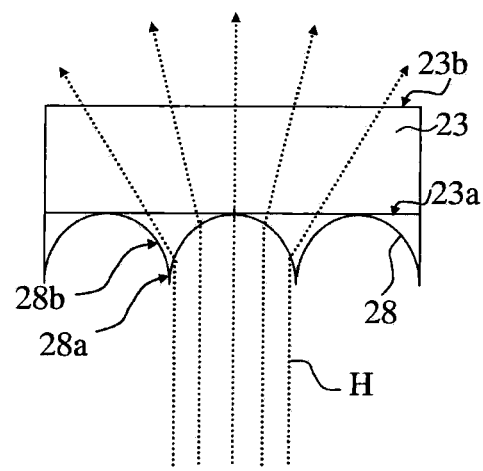
FIG. 6(*a*) is a diagram showing an example of a shape of a lens of a light deflection element.
Figure 6B:
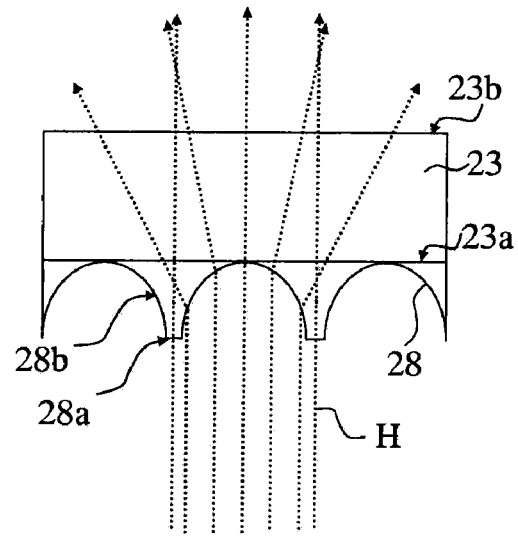
Figure 6C:
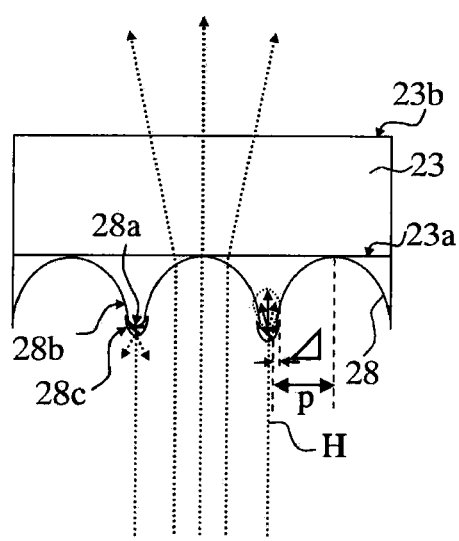
Figure 6D:
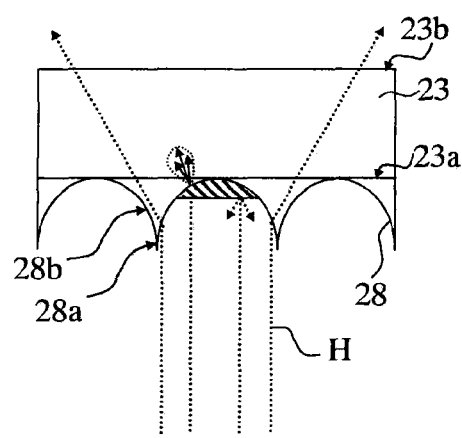
Figure 7A:
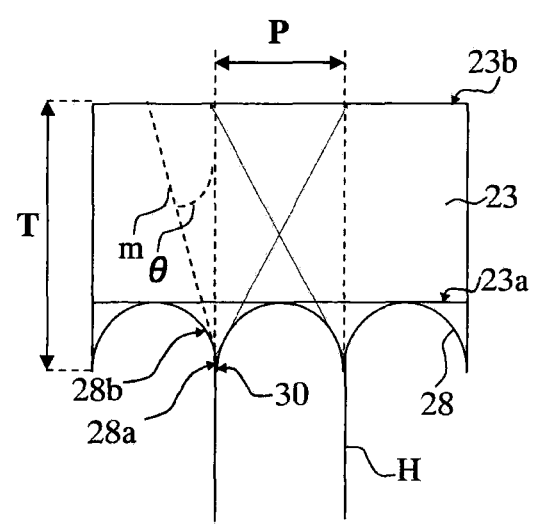
FIG. 7(*a*) is a diagram explaining formula 1 in the case where a light deflection element is a convex lens.
Figure 7B:
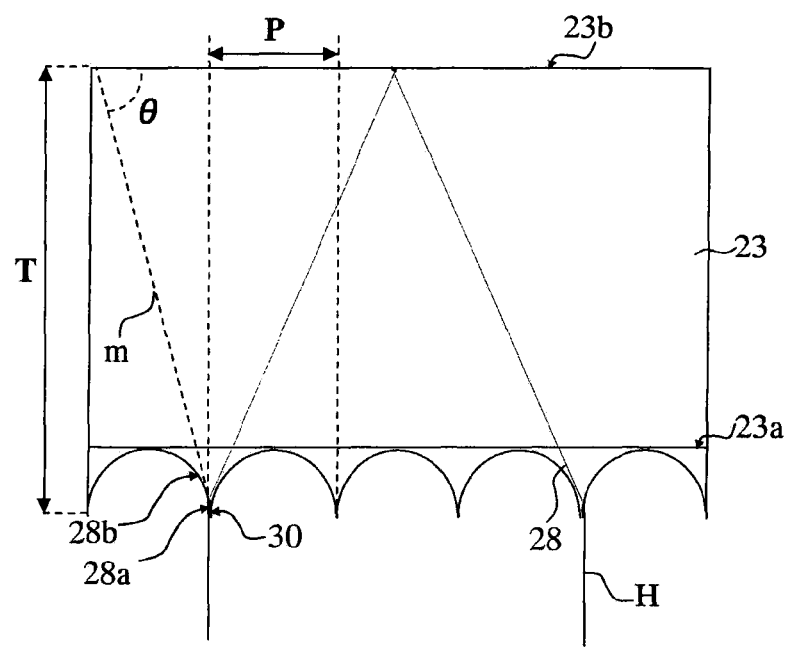

As shown in FIG. 6(a), the light deflection element 28 may be concave-lens shaped. An inversed shape of the above mentioned triangle prism, the convex curved lens, the curved triangle prism and a combination thereof is desirable as the shape of the concave lens,. In this case, as shown in FIG. 7, θ in the above formulas 1 and 2 is defined as an angle θ between a tangential line m at a point 30 where a first slope surface 28b connects with a first top part 28a and a surface 23a of an opposite side to an observer side of a light propagation layer 23. Therefore, a thickness T of the light propagation layer 23 is defined as a distance from a first top part 28a of a concave lens to a diffusion base 26. Therefore, compared with a convex lens shape, a thickness of the optical device 24 and the optical uniform device 25 can be thinner, which is desirable. In addition, as shown in FIG. 6(b), a first top part 28a of a concave lens can be an almost flat surface. In the case of a flat surface, wear or a chipping of a metal mold for shaping a light deflection lens 28 rarely occurs. Further, in addition, as shown in FIG. 6(c), a light diffusion/reflection layer 28c can be formed on a first top part 28a which is almost a flat surface. At this time, an over area Δ toward a first slope surface 28b is preferably equal to or less than 30% of a width pl of a first slope surface 28b. Further, in addition, as shown in FIG. 6(d), a light cover layer 28c is formed on a concave surface of a concave lens. A concave surface of a concave lens is a region where a deflection angle is small. Therefore, if a light cover layer 28c is formed on a concave surface, diffusion performance is improved. For example, an inkjet, a water repellent/oil repellent treatment or the like can be exemplified as a formation method.

Figure 8A:
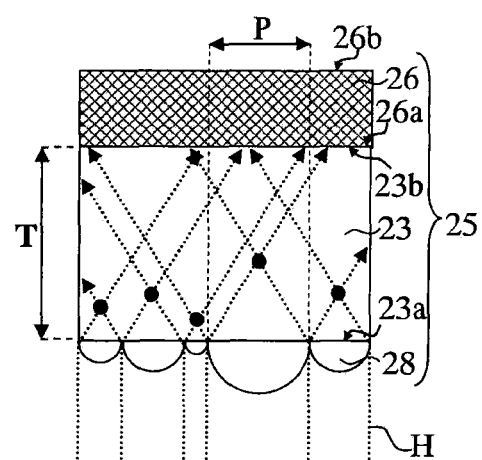
FIG. 8(*a*) is a diagram explaining a case where a height and a pitch of a lens of a light deflection element are not constant.
FIG. 8(b) is a diagram explaining a case where a height of a lens of a light deflection element is not constant.
FIG. 8(c) is a diagram explaining a case where a height and a pitch of a lens of a light deflection element are constant.
Figure 8B:
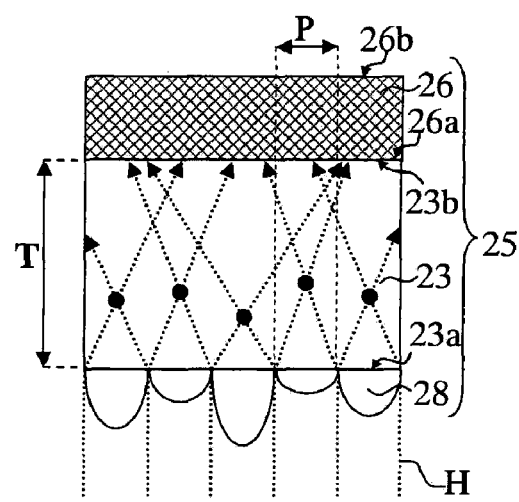
Figure 8C:
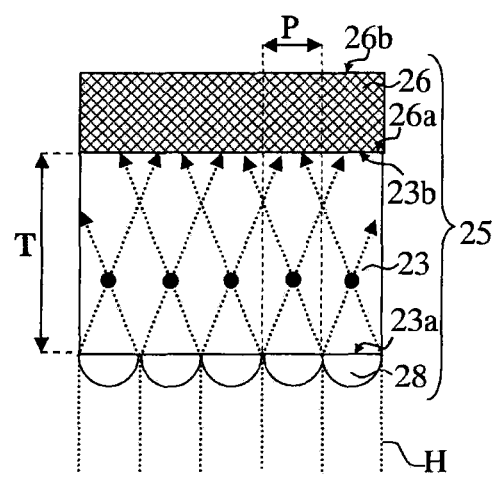
Figure 9:
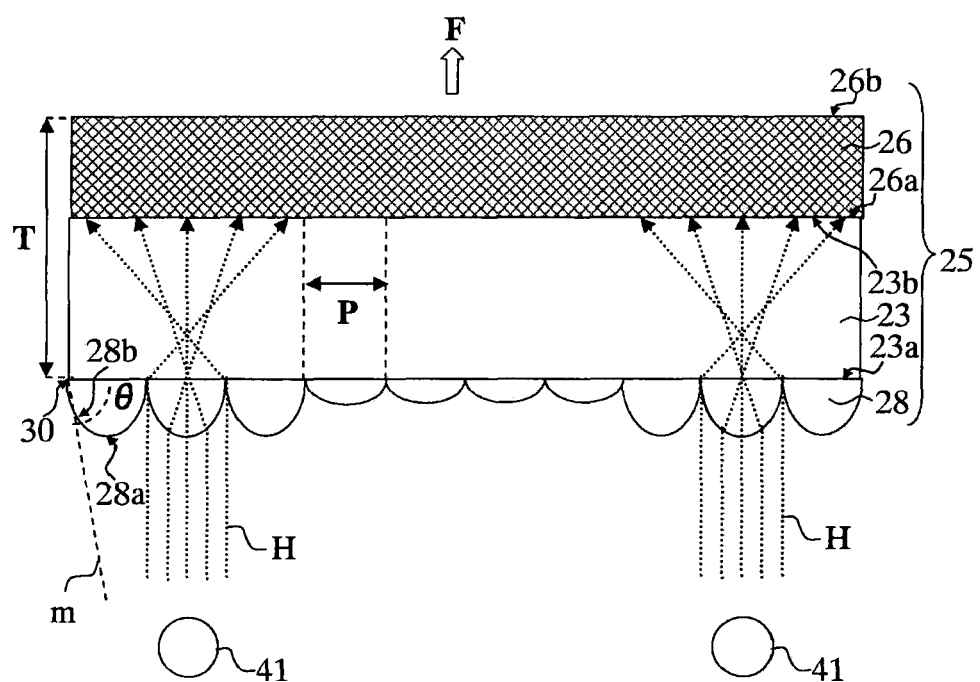
FIG. 9 is a diagram showing an example in the case where alignment between a light deflection element and a light source is performed.

The light deflection element 28 can be formed by appropriately arranging and combining a plurality of the above mentioned lenses. In addition, as shown in FIG. 8(a) and FIG. 8(b), a unit lens having a different pitch P or different height can be arranged. In this case, a farthest focus point α of the light deflection element 28 is non-uniformly arranged inside the light propagation layer 23. In FIG. 8(c), a farthest focus point α is linearly arranged and is parallel to a direction of arrangement of a unit lens of the light deflection element 28. When front light H enters into the light deflection element 28, a light focus point is generated on a center line of a unit lens while aberration is generated on the center line. Then, in the present invention, in order to simplify explanation, a focus point which is farthest from a lens top point is defined as a farthest focus point α. FIGS. 8(a)-(c) show an example in which a point where light incident to both ends of a unit lens is deflected and crosses becomes a farthest focus point α. In FIG. 8(c), for example, in the case where all of the light deflection elements 28 have an identical shape, a position of a farthest focus point α of light incident to each light deflection element 28 is located on an identical surface. Therefore, incident light H coming from an incident surface of the optical device 24 and the optical uniform device 25 has an identical diffusion performance at any region. Therefore, the optical device 24 and an optical uniform device without non-uniformity can be provided. However, as shown in FIG. 8(a) and FIG. 8(b), in the case where a shape of a lens of the light deflection element 28 is not identical, a farthest focus point α of light incident to each light deflection element 28 is not located at an identical surface. Therefore, a thickness T of the light propagation element 28 differs according to each light deflection element 28. At this time, it is desirable that the thickest T among respective lenses combined with each other is selected for the thickness T of a light propagation layer 23. If the thickest T is selected, in all of the arranged light deflection elements 28, the above mentioned formulas 1 and 2 can be satisfied, therefore a diffusion effect can be obtained with certainty. For example, in the case where the light source 41 is very near the optical device 24 and the optical uniform device 25, in the case where a distance between light sources 41 is very long, or in the case where a distance between light sources 41 is not uniform, a farthest focus point α is arranged non-uniformly, which is effective. Especially, in the case where a plurality of light deflection elements are combined, the light deflection elements may be arranged regularly in accordance with a position of the light source 41. At this time, in a region directly above the light source 41, it is desirable that the light deflection element 28 in which a thickness T of the light propagation layer 23 can be adjusted to be the smallest is arranged. As a result, the diffusion performance of a region just above the light source 41 can be increased, therefore non-uniformity in brightness can be further reduced.

A pitch P of the light deflection element 28 can be appropriately determined. However, the larger a pitch P of the light deflection element 28, the thicker a thickness T of the light propagation layer 23. Actually, it is necessary that a pitch P is equal to or more than 10 μm and equal to or less than 300 μm, and is more preferable that a pitch is equal to or more than 10 μm and equal to or less than 200 μm.

The light deflection element 28 can be shaped and be formed by using an electron beam curable resin such as an ultraviolet curable resin on a surface 23a of an opposite side to an observer side F of the light propagation layer 23. For example, the diffusion base 26 and the light propagation layer 23 can be shaped as one body of a plate shaped member by an extrusion method, and the light deflection element 28 can be shaped by using ultraviolet light on a surface 23a of an opposite side to an observer side F of the light propagation layer 23. Further, in addition, the light propagation layer 23 is shaped as a plate shaped member by an extrusion method or an injection molding method, and the shaped light propagation layer 23 is combined with the diffusion base 26 as one body. Before or after the combination, the light deflection element 28 can be shaped and be formed by using ultraviolet light on a surface 23a of an opposite side to an observer side F of the light propagation layer 23.

In addition, the light deflection element 28 can be formed by an injection molding method or a heat press molding method using PET (polyethylene terephthalate), PC (polycarbonate), PMMA (polymethylmethacrylate), COP (cycloolefin polymer), acrylonitrile, styrene copolymer, acrylonitrile polystyrene copolymer or the like. In addition, the light deflection element 28 can be shaped and be formed by using a radiation curing resin on a surface of a sheet material manufactured by the same method.

Figure 10A:
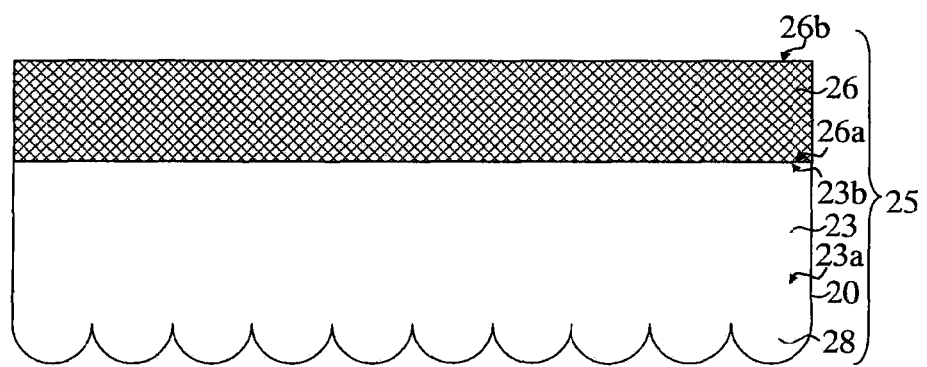
FIG. 10(a) is a diagram showing an embodiment where an optical uniform device is shaped as one body.
Figure 10B:
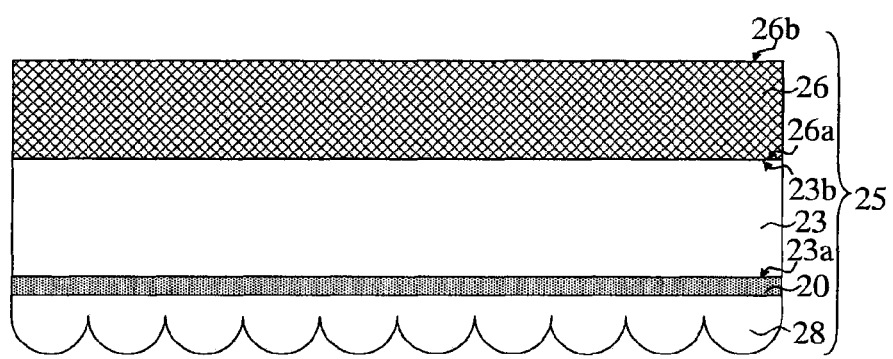
FIG. 10(b) is a diagram showing an embodiment where a light deflection element is shaped as a sheet.

The optical device 24 of the present invention can be manufactured by an extrusion molding method. In addition, as shown in FIG. 10(a), the optical device 24 and diffusion base 26 can be shaped as one body by a multi-layer type extrusion method. On the other hand, as shown in FIG. 10(b), after it is shaped as a sheet, it is arranged above a surface 23a of an opposite side to an observer side F of the light propagation layer 23 by laminating using a fixing layer 20. In this case, it is desirable that the light deflection element 28 shaped as a sheet includes an ultraviolet light absorber. When the light deflection element 28 shaped as a sheet includes an ultraviolet light absorber, peeling of the fixing layer 20 due to degradation by ultraviolet light can be prevented.

Here, the fixing layer 20 can be formed by using an adhesive. A resin of an urethane type, an acrylic type, a rubber type, a silicone type, vinyl type, or the like can be used as the adhesive,. In addition, one liquid type which is adhered or is cured by heat or light, and an adhesive in which two or a plurality of liquids are mixed and cured, can be used as the adhesive.

Furthermore, a filler may be dispersed inside the fixing layer 20. When the filler is dispersed inside the fixing layer 20, the elastic modulus of a fixing layer can be increased. A method for forming the fixing layer 20 includes a method in which application is performed directly on a connection surface or a method in which a dry film prepared beforehand is attached. In the case where the fixing layer 20 is prepared as a dry film, in view of a manufacturing process, ease of handling is possible, which is desirable.

In addition, it is desirable that the fixing layer 20 has a function of preventing warpage. If a coefficient of thermal expansion of the fixing layer 20 is adjusted so as to be almost the same as the coefficient of thermal expansion of the diffusion base 26, it is possible to prevent warpage of the optical uniform device 25 itself Furthermore, if a coefficient of thermal expansion of the light deflection element 28 shaped as a sheet is adjusted so as to be almost same as the coefficient of thermal expansion of the diffusion base 26, it is possible to prevent warpage of the optical uniform device 25 it self It is desirable that a thickness of the light deflection element 28 shaped as a sheet is 10 μm-1 mm. This is because, if the light deflection element 28 shaped as a sheet is too thin, wrinkles or the like are generated, and if the light deflection element 28 shaped as a sheet is too thick, it becomes difficult to stack the light deflection element 28 of the light propagation layer 23. Here, a base region of the light deflection element 28 shaped as a sheet can be considered as the light propagation layer 23. Therefore, if the light deflection element 28 is shaped as a thick sheet, a thickness of the light propagation layer 23 can be thinned. In addition, it becomes possible to stack directly on the diffusion base 26.

A surface of the light deflection element 28 can have a finer concave-convex. A fine concave-convex can further increase the deflection effects by the light deflection lens 28. At this time, it is desirable that a surface roughness Ra is within a range of 0.1 μm-10 μm. In the case where a concave-convex structure has a surface roughness of less than 0.1 μm, it is difficult to obtain deflection effects. In addition, in the case where a concave-convex structure has surface roughness of more than 10 μm, the structure itself becomes the light deflection element 28. A method for forming a fine concave and convex is as follows. For example, the light deflection element 28 itself or a surface of a metal mold for shaping are made rough by etching or sandblast. Alternatively, a metal mold for shaping the light deflection element 28 is cut to make a fine concave and convex shape.

In addition, as long as the light deflection element 28 deflects incident light H, it is not necessary to have the lens shape as mentioned above. For example, the light deflection element 28 may be a diffusion layer formed by a resin filler, a bubble or the like. This is because, incident light H is deflected by the light deflection element 28, the deflected light is broadened by a light propagation layer and light is further diffused by the diffusion base 26, thereby diffusion performance is improved.

It is preferable that total luminous transmittance of the light propagation layer 23 constituting the optical uniform device 25 of the present invention is equal to or more than 80%. In the case where total luminous transmittance is equal to or more than 80%, the brightness of the light emitted toward an observer side F does not decrease. On the contrary, in the case where total luminous transmittance is less than 80%, brightness of light emitted toward an observer side F decreases, which is not preferable. In addition, total luminous transmittance is a value measured according to JIS K7361-1.

In addition, it is preferable that a haze value of the light propagation layer 23 is equal to or less than 95%. The light propagation layer 23 broadens and propagates incident light deflected by the light deflection lens 28, thereby light enters into the diffusion base 26. Therefore, in the case where a haze value is more than 95%, sufficient light diffusion effect can not be obtained, which is not preferable. In addition, a haze value is a value measured according to JIS K7136.

A transparent resin made of a thermoplastic resin is preferable as a material used for the light propagation layer 23. For example, polycarbonate resin, acrylic resin, fluorinated acrylic resin, silicone acrylic resin, epoxy acrylate resin, polystyrene resin, cycloolefin polymer, methylstyrene resin, florene resin, PET, polypropylene, acrylonitrile stylene copolymer, acrylonitrile polystylene copolymer or the like can be exemplified. In addition, the light propagation layer 23 may be stretched in at least one direction.

It is more desirable that that light propagation layer 23 does not include a light diffusion element. In the case where the light propagation layer 23 does not include a light diffusion element, light deflected by the light deflection element 28 can be effectively broadened and propagated.

The light propagation layer 23 can have a multi-layer structure with two or more layers. At this time, it is desirable that the following formula 3 is satisfied wherein a refractive index of a layer 23A of the light deflection element 28 side is n1, a refractive index of a layer 23B of the diffusion base 26 side is n2 and a refractive index of the light deflection element 28 is n0:

$$n0 \geq n1 \geq n2 \quad \text{(formula 3)}$$

Figure 11A:
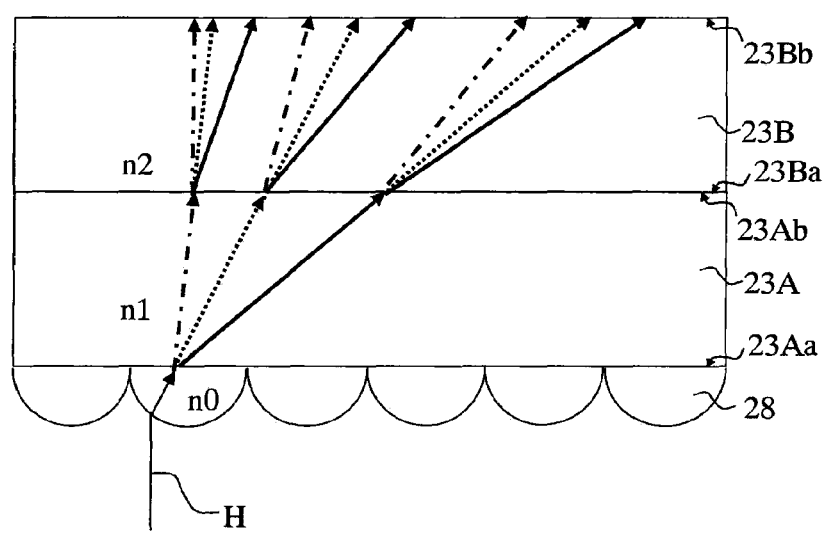
FIG. 11(a) is a diagram explaining light in the case where a light propagation layer has a multi-layer structure.

Formula 3 is explained using FIG. 11(a).

When light H enters into the light deflection element 28, light H is deflected by both a refractive index of air and a refractive index n0 of the light deflection lens 28. At this time, the larger the refractive index n0 of the light deflection element 28, the larger the refraction angle. Therefore, it is desirable that a refractive index n0 of the light deflection element 28 is larger.

In FIG. 11(a), in respective interfaces between the light deflection element 28, a layer 23A of the light deflection element 28 side of the light propagation layer 23, and a layer 23B of the diffusion base 26 side of the light propagation layer 23, in the case where light travels from the light source 21 side to an observer side F, a case where a refractive index increases at an interface is shown by a two-dot chain line, a case where a refractive index does not change at an interface is shown by a dot-line, and a case where a refractive index decreases at an interface is shown by a solid line.

For example, when light deflected by the light deflection element 28 enters into the light propagation layer 23, n0>n1. That is, in a case where a refractive index decreases, light is deflected toward a direction shown by a solid line. An angle between deflected light and a surface 23a of the opposite side to an observer side F of the light propagation layer 23 decreases, therefore diffusion performance is improved.

On the contrary, in the case where n0<n1 (that is, a refractive index increases), light is deflected toward a direction shown by a two-dot chain line. An angle between deflected light and a surface 23a of an opposite side to an observer side F of the light propagation layer 23 increases, therefore diffusion performance is reduced.

Similar to this, at an interface between a layer 23A of the light deflection element 28 side of the light propagation layer 23 and a layer 23B of the diffusion base 26 side of the light propagation layer 23, in the case where n1>n2 (that is, a refractive index decreases), diffusion performance is improved.

Therefore, if a refractive index n0 of the light deflection element 28 is compared with a refractive index n1 of a layer 23A of the light deflection element 28 side of the light propagation layer 23, it is desirable that both are the same or n0>n1. If a refractive index n1 of a layer 23A of the light deflection element 28 side of the light propagation layer 23 is compared with a refractive index n2 of a layer 23B of the diffusion base 26 side of the light propagation layer 23, it is desirable that both are the same or n1>n2.

Figure 11B:
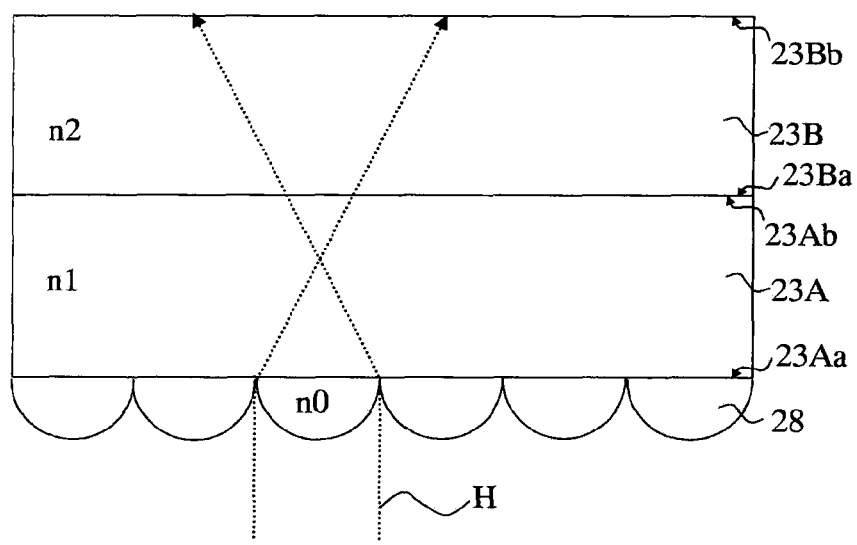
FIG. 11(b) is a diagram explaining light in the case where a light propagation layer has a multi-layer structure.

Here, it is more desirable that a thickness of a layer 23B of the diffusion base 26 side of the light propagation layer 23 is larger than a thickness of a layer 23A of the light deflection element 28 side of the light propagation layer 23. This is because it is possible to largely broaden light inside a layer 23B of the diffusion base 26 side of the light propagation layer 23. Further, as shown in FIG. 11(b), light entering at both ends of a unit lens of the light deflection element 28 is deflected and its intersection point is located at a layer 23A of the light deflection element 28 side of the light propagation layer 23.

In addition, in the case where the light propagation layer 23 has a multi-layer structure with two or more layers, it is desirable that a farthest focus point α of the light deflection element 28 is included in a layer contacting with a light outgoing surface (that is, a surface 23a of an opposite side to an observer side F of the light propagation layer 23) of the light deflection element 28. Thereby, a farthest focus point is positioned near the light deflection element 28 inside the light propagation layer 23. Therefore, light can be largely diffused.

The light propagation layer 23 described above can be formed by shaping a plurality of layers having different refractive index by a multi-layer extrusion method. In addition, the light propagation layer 23 may be shaped by an extrusion method or an injection molding method, the light deflection element 28 is shaped as a sheet by using a material having a higher refractive index than a refractive index of the light propagation layer 23, and laminate them as to be one body.

If the light propagation layer 23 has a multi-layer structure, warpage can be prevented. In this case, if a coefficient of thermal expansion of a layer which is the farthest layer from an observer side is adjusted so as to be almost the same as a coefficient of thermal expansion of the diffusion base 26, warpage of the optical device 24 and the optical uniform device 25 can be prevented. In addition, if a thickness of the light propagation layer 23 is adjusted, warpage of the optical device 24 and the optical uniform device 25 can be also prevented.

It is desirable that total luminous transmittance in the diffusion base material 26 is 30-60%. In the case where the total luminous transmittance is less than 30%, brightness of light emitted toward an observer side F is reduced, which is not preferable. On the contrary, in the case where the total luminous transmittance is more than 80%, diffusion performance is insufficient and uniformity of brightness within a surface is reduced, which is not preferable.

It is preferable that a haze value of the diffusion base material 26 is equal to or more than 95%. In the case where the haze value is less than 95%, diffusion performance is insufficient and uniformity of brightness within a surface is reduced, which is not preferable.

A diffusion base is formed such that a light diffusion area is dispersed in a transparent resin. A thermoplastic resin, a thermal curing resin or the like can be used as the transparent resin. For example, polycarbonate resin, acrylic resin, fluorinated acrylic resin, silicone acrylic resin, epoxy acrylate resin, polystyrene resin, cycloolefin polymer, methylstyrene resin, florene resin, PET, polypropylene, acrylonitrile stylene copolymer, acrylonitrile polystylene copolymer or the like can be exemplified.

It is desirable that a light diffusion region is comprised of a light diffusion particle. This is because preferable diffusion performance can be easily achieved. A transparent particle comprised of an inorganic oxide or a resin can be used as the light diffusion particle. For example, silica, alumina or the like can be used as a transparent particle comprised of an inorganic oxide. In addition, an acrylic particle, a stylene particle, a stylene acrylic particle and a cross-link body thereof, a particle of melamine formalin condensate, a fluorine polymer particle such as PTFE (polytetrafluoroethylene), PFA(perfluoroalkoxy resin), FEP(tetrafluoroethylene hexafluoropropylene copolymer) and PVDF(polyfluoro vinylidene) and ETFE(ethylene tetrafluoroethylene copolymer), a silicone resin particle or the like can be used as a transparent particle comprised of a resin. In addition, two or more kinds of transparent particles among the above are combined and the combined particle can be used. Further, the size or shape of a transparent particle is not especially limited.

In the case where a light diffusion particle is used as a light diffusion region, it is desirable that a thickness of the diffusion base 26 is 0.1-5 mm. In the case where a thickness of the diffusion base 26 is 0.1-5 mm, an optimum diffusion performance and brightness can be achieved. On the contrary, in the case of less than 0.1 mm, diffusion performance is insufficient. In the case of more than 5 mm, the amount of a resin is too high and brightness is reduced due to absorption.

In addition, in the case where a thermoplastic resin is used as a transparent resin, a bubble can be used as a light diffusion region. That is, an inside surface of a bubble formed inside a thermal plastic resin generates diffused reflection of light, thereby a light diffusion function which is the same or more as the case where a light diffusion particle is dispersed can be achieved. Therefore, a film thickness of a diffusion base material 29 can be even thinner.

A white PET and a white PP can be exemplified as the diffusion base material 26 described above. A white PET is formed as follows. A filler such as a resin titanic oxide ($TiO_2$) and barium sulfate ($BaSO_4$) without compatibility with a PET is dispersed in a PET. Thereafter, the PET is stretched by a biaxial stretching method. Thereby, a bubble is generated around the filler.

In addition, the diffusion base 26 made of a thermal plastic resin is needed to be stretched in at least one direction. This is because, if it is stretched in at least one direction, a bubble can be generated around the filler.

Examples of a thermal plastic resin are as follows. Polyethylene terephthalate (PET), polyethylene-2,6-naphthalate, polypropylene terephthalate, polybutylene terephthalate, polyester type resin such as cyclohexane dimethanol copolymer polyester resin, isophthalic acid copolymer polyester resin, sporo glycol copolymer polyester resin and fluorene copolymer polyester resin, polyethylene, polypropylene, polymethylpentene, polyolefin type resin such as alicyclic olefin copolymer resin, acrylic resin such as polymethylmethacrylate, polycarbonate, polystyrene, polyamide, polyether, polyester amide, polyether ester, polyvinyl chloride, cycloolefin polymer, copolymer including these as a component and a mixture thereof The type of thermal plastic resin is not especially limited.

In the case where a bubble is used as a light diffusion region, it is preferable that a thickness of the diffusion base 26 is 25-500 μm. In the case where a thickness of the diffusion base 26 is less than 25 μm, a sheet does not have sufficient stiffness, thereby wrinkles are easily generated in a manufacturing process or inside a display, which is not desirable. In addition, in the case where a thickness of the diffusion base 26 is more than 500 μm, there is no particular problem in optical performance. However, rigidity increases, thereby it is difficult to shape the diffusion base 26 as a roll and it is difficult to make a slit. That is, the advantage of thinness decreases when compared with a conventional diffusion plate, which is not desirable.

It is preferable in view of a manufacturing process that the optical uniform device 25 is formed by shaping the diffusion base material 26, the light propagation layer 23 and the light deflection element 28 as one body by a multi-layer extrusion method. In addition, the optical uniform device 25 may be stretched in at least one axis direction.

If a multi-layer extrusion method is used, a manufacturing process can be simplified and be efficient while manufacturing costs can be reduced.

The optical uniform device 25 may be formed as follows. The diffusion base material 26 and the light propagation layer 26 are respectively and independently shaped by an extrusion method, an injection molding method or the like. Thereafter, both components are attached to each other by an adhesive so as to be one body. For example, a diffusion base can be attached to the light propagation layer 23 by a generally used laminate as an adhesive.

Figure 12A:
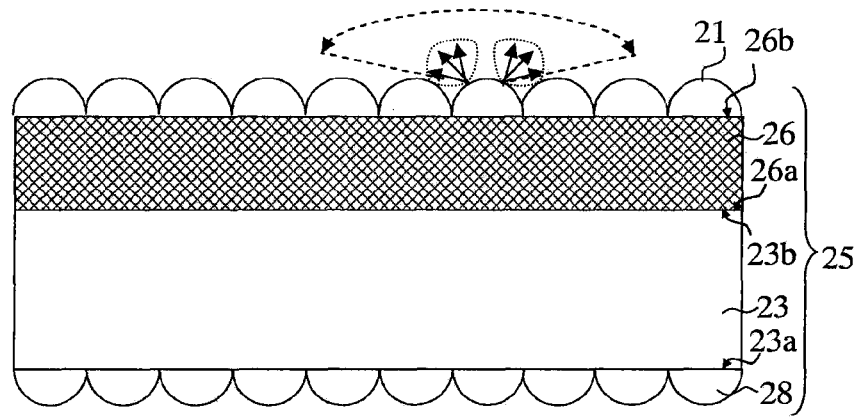
FIG. 12(a) is a diagram explaining an effect by providing a concave and convex shape to an emitting surface of an optical uniform device.
Figure 12B:
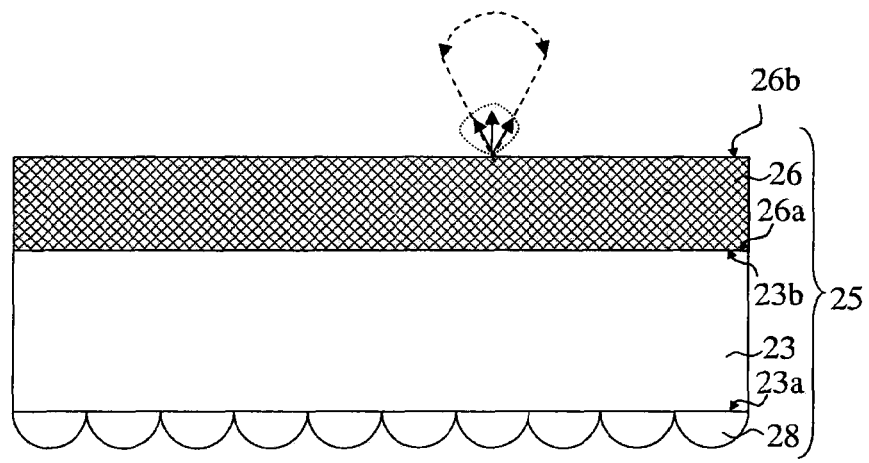
FIG. 12(b) is a diagram explaining a case where an emitting surface of an optical uniform device is flat.
Figure 13A:
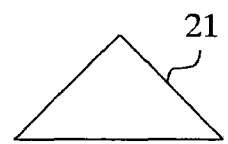
FIG. 13(a) is a diagram showing an example of a lens shape of a light diffusion lens.
Figure 13B:
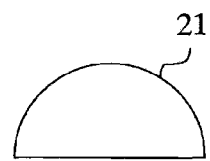
FIG. 13(b) is a diagram showing an example of a lens shape of a light diffusion lens.
Figure 13C:
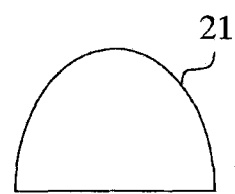
FIG. 13(c) is a diagram showing an example of a lens shape of a light diffusion lens.
Figure 13D:
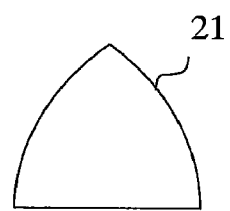
FIG. 13(d) is a diagram showing an example of a lens shape of a light diffusion lens.
Figure 13E:
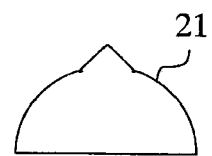
FIG. 13(e) is a diagram showing an example of a lens shape of a light diffusion lens.

The optical uniform device 25 of the present invention can have a concave-convex shape on a surface 26a of an observer side F of the diffusion base 26. As shown in FIG. 12, if a light outgoing surface 26b of the optical uniform device 25 has a concave-convex shape, a light outgoing surface having various angles is formed compared with a case where a surface 26b of an observer side F of the diffusion base 26 is almost flat. Therefore, light can be emitted in a broader range, thereby diffusion performance is improved and an image of a lamp is reduced or is removed. The light diffusion lens 21 can be exemplified as the concave-convex shape provided to the observer side.

A triangle prism shown in FIG. 13(*a*) is desirable as the light diffusion lens 21. This is because lens shaping is easy and the direction of emitted light can be easily controlled. In addition, a convex curved lens shape as shown in FIG. 13(*b*) is desirable. This is because a light outgoing surface is adjusted to have various angles and diffusion performance is improved. A non-sphere shape shown in FIG. 13(*c*) is further desirable as a convex curved lens shape. This is because a curvature radius of a top part can be made small and diffusion performance is increased. Further, a curved triangle prism shown in FIG. 13(*d*) is desirable as the light diffusion lens 21. There is no surface parallel to a surface 26b of an observer side of the diffusion base 26, and a light outgoing surface can be adjusted to have various angles. Thereby, diffusion performance is improved. In addition, the light diffusion lens 21 can be a combination of a plurality of the above described lens shapes. For example, as shown in FIG. 13(*e*), a shape in which a triangle prism is formed above a convex curved lens can be adopted. This is because the diffusion effects by two or more lens shapes allow diffusion performance to be increased. Other than these, a lens shape exemplified as the light deflection element 28 can be used.

The light diffusion lens 21 may be an embodiment in which a plurality of the above lenses are appropriately combined and are arranged. For example, in a region just above the light source 41, the diffusion lens 21 having a high diffusion performance is arranged, and the diffusion lens 21 having a low diffusion performance is arranged between a pair of light sources 41.

However, in the case where the diffusion lens 21 is arranged on a surface of the diffusion base 26, if a lens sheet 2 is arranged as an optical component 2, moire interference may occur between the diffusion lens 21 and lens sheet 2. Therefore, a cycle structure of the diffusion lens 21 and a cycle structure of the lens sheet 2 are adjusted so that moire interference does not occur due to the pitch. Alternatively, the angle is adjusted, or a diffusion film is placed on top as an optical component 2. If, as the optical component 2, a component without a cycle structure such as a diffusion film or a reflective polarizer is arranged, the above problem does not occur.

In the optical uniform device of the present invention, It is desirable that the light outgoing surface, that is the surface 26b of an observer side F of the diffusion base 26, is almost flat. The reason is explained using FIG. 14.

Figure 14:
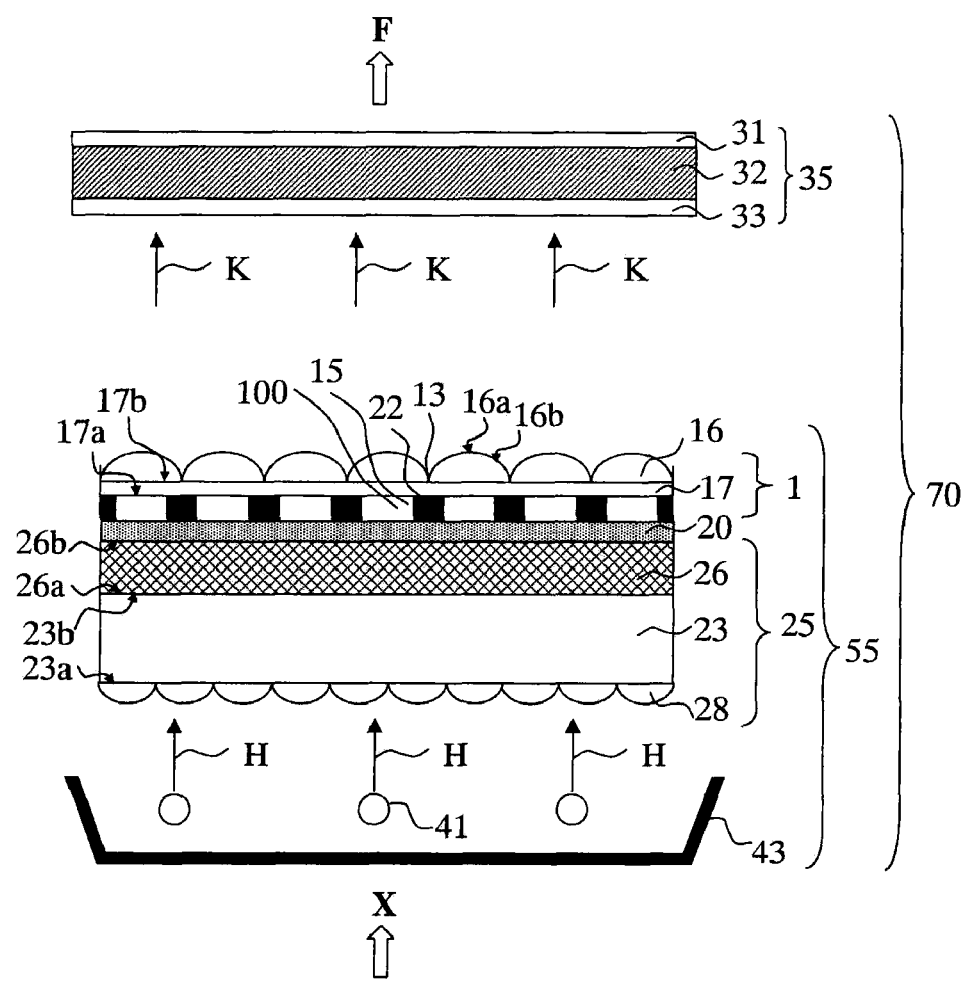
FIG. 14(a) is a schematic cross sectional diagram of a display device of an embodiment of the present invention.
FIG. 14(b) is a schematic cross sectional diagram of a display device of an embodiment of the present invention.

FIG. 14 is a schematic cross sectional diagram showing an example of an optical sheet, a backlight unit and a display device of the present invention. The optical sheet 52 is formed by stacking an optical film 1 on an optical uniform device 25 of the present invention through a fixing layer 20 to form one body. The optical film 1 is comprised of a light transmittance base 17 and a light collecting lens 16. A plurality of light collecting lenses 16 having a constant pitch are arranged on a surface 17b of an observer side of the light transmittance base 17.

If the light collecting lens 16 is formed on the surface 17b of an observer side F of the light transmittance base 17, light passing through the optical uniform device 25 is collected toward an observer side F, thereby brightness of an observer side F can be improved.

A surface 17a of an opposite side to an observer side F of a light transmittance base material 17 is an almost flat surface. A plurality of light masks 22 are formed thereon. Further, through a fixing layer 20, an optical uniform device 25 is connected to them. A thermal plastic resin, a heat-curable resin or the like can be used as a material of the light transmittance base 17. A material used for the optical uniform device 25 can be also used. It is possible to control the occurrence of warpage by using the material used for the optical uniform device 25.

In addition, moire interference may occur in the case where a unit lens is respectively formed on both one surface and another surface of one component, However, in the optical sheet 52 of the present invention, because the diffusion base 26 is arranged between the light collecting lens 16 and the light deflection element 28, moire interference can be prevented. Here, since there is no diffusion element between the light collecting lens 16 and the diffusion base 26, and in order that an optical film 1 is uniformly attached to a surface 26b of an observer side F of the diffusion base 26, it is desirable that a surface 26b of an observer side of the diffusion base material 28 is almost flat.

A shape of the light collecting lens 16 is a convex curved surface shape, and has a third top part 16a with an arcuate surface and a third slope surface 16b from a third top part 16a to a light transmittance base. In addition, the collecting lens 16 is formed so that a distance between opposing third slope surfaces 16b gradually decreases if a distance to a third top part 16a becomes small. Furthermore, collecting lens 16 are separated from each by a valley part 13 by forming at a constant pitch.

A plurality of light masks 22 and an opening part for light transmission (an air layer) 100 are arranged between the optical film 1 and the optical uniform device 25. A pitch of the light mask 22 and an air layer 15 is almost the same as a pitch of the light collecting lens 16. A position of the light mask 22 is arranged so as to correspond with a position of the valley part 13. Therefore, a position of the air layer 100 is arranged so as to correspond with a third top part 16*a* of the light collecting lens 16.

A light mask 22 is comprised of a material having a high light shielding property, and is formed at a position corresponding to a position of the valley part 13 by which the light collecting lens 16 formed of a surface 17*b* of an observer side F is separated. Therefore, a large part of the light incident to the optical film 1 passes through the air layer 100 which is formed so as to separate light masks 22, and enters into the light collecting lens 16. Therefore, light which passes through an optical uniform device 25 is emitted efficiently towards a front direction (an observer side) F.

Here, a light mask can be made of a light reflection component such as a metal material or a white reflection material. In this case, light reflected by the light mask 22 returns to the diffusion base 26 constituting the optical uniform device 25, and is diffused again by the diffusion base 26. Thereafter, part of the light enters into the optical film 1 again, while part of the light is emitted towards a light source side from the optical uniform device 25 and is reflected by a reflection plate constituting a lamp house, thereafter it enters into the optical uniform device again, and is further diffused and enters into the optical film 1 again. This process is repeated, thereby a large part of the light from the light source 41 can be emitted towards an observer side F.

In the case where the light mask 22 is constituted by a light reflection component, it is desirable that its reflectance is equal to or more than 80%. If its reflectance is equal to or more than 80%, a large part of the light entering the optical film 1 can enter the light collection lens 16 from the air layer 100. Therefore, brightness of an observer side F is increased. In the case where the reflectance is less than 80%, light passing through the light mask 22 is increased, and a ray of non-efficient light entering the collecting lens 16 is increased, thereby brightness reduction of an observer side F occurs.

A method for manufacturing the optical film 1 is, for example, a method using self-alignment. The light collecting lens 16 is shaped at a surface 17*b* of an observer side of the light transmittance base 17, and a light sensitive adhesive resin is attached to a surface 17*a* of an opposite side to an observer side F of the light transmittance base 17. Ultraviolet light is irradiated from a light collection lens 16 side, thereby a light sensitive adhesive resin of a position corresponding to a third top part 16*a* of the light collection lens 16 is exposed and is cured, thereby its adhesive properties disappear. Thereafter, the light mask 22 is transferred, and the light mask 22 can be formed at a position corresponding to the valley part 13 of the collection lens 16.

An optical film 1 manufactured by the above process is attached to the optical uniform device 25 by a laminating process via the fixing layer 20, thereby an optical sheet 52 is manufactured. At this time, a material of a fixing layer 20 is appropriately selected so that the air layer 100 is maintained.

A fixing layer 20 is formed by using an adhesive. A resin such as an urethane type, an acrylic type, a rubber type, a silicone type and a vinyl type can be used for the adhesive. In addition, a material which is one liquid type and is used by pressing itself can be used, and a material which is used by mixing two or more liquids and curing can be used for the adhesive. Further, a filler can be dispersed inside the fixing layer 20. If a filler is dispersed inside the fixing layer 20, elastic modulus of the fixing layer 20 can be increased. In the case where the elastic modulus of the fixing layer 20 is increased, when the optical film 1 and the optical uniform device 25 are made as one body, the fixing layer 20 does not enter inside a region of the air layer 100, thereby the air layer 100 is easily maintained. A method in which a connection surface is directly applied, and a method in which a dry film prepared beforehand is attached are methods for forming the fixing layer 20. The case where the fixing layer 20 is prepared as a dry film is desirable in view of a manufacturing process because it is easily handled.

However, in the case where a stretched film such as a PET is used for the light transmittance base 17 constituting the optical film 1, heat from the light source 41 may allow an optical sheet 52 to warp so that an optical sheet 52 of the light source 41 side becomes convex-shaped. At this time, a material of a layer 23A of the light deflection element 28 side of the light propagation layer 23 having a multi-layer structure with two or more layers can be arranged as a warpage preventing layer. That is, a layer 23A of the light deflection element 28 side of the light propagation layer 23 generates a moment by heat which allows the optical sheet 52 to have a shape in which an optical source side thereof becomes convex. Thereby, respective moments cancel each other, and warpage is prevented. For example, the light deflection element 28 is shaped on a material which is the same as the light transmittance base 17, and is attached to a surface 23*a* of an opposite side to an observer side F of the light propagation layer 23 by the fixing layer 20. Thereby, warpage can be prevented.

An optical sheet 52 manufactured by the above method is constituted by the optical uniform device 25 which uniformly diffuses light H from the light source 41, and the optical film 1 including the air layer and the light mask 22, both making light efficiently enter into the light collecting lens 16. Therefore, diffusion/light collecting functions can be satisfied by only one sheet of the optical sheet 52.

FIG. 15 is a schematic cross sectional diagram showing another example of an optical sheet, a backlight unit and a display device of the present invention. The optical sheet 52 is formed by stacking the optical film 1 and optical uniform device 25 of the present invention as one body via the fixing layer 20. The optical film 1 is comprised of the light transmission base 17 and the light collecting lens 16. A plurality of light collecting lenses 16 with a constant pitch is arranged on a surface 17*b* of an observer side of the light transmission base 17.

If the light collecting lens 16 is formed on a surface 17*b* of an observer side of the light transmission base 17, light passing through the optical uniform device 26 is collected toward an observer side F. Thereby, brightness of an observer side F can be improved.

A surface 17*a* of an opposite side to an observer of the light transmission base 17 is almost flat, and a plurality of ribs 29 is formed thereon. Further, the optical uniform device 25 is connected to the surface 17*a*A thermal plastic resin, a heat curable resin or the like can be used as a material of the light transmittance base 17. A material used for the optical uniform device 25 can be also used. If a material used for the optical uniform device 25 is used, occurrence of warpage can be controlled.

For example, a triangle prism shape is exemplified as a shape of the light collection lens 16. A light collecting property toward a front direction is high in the triangle prism. Therefore, an optical sheet 52 of high brightness can be obtained. In addition, a convex curved shape is exemplified as a shape of the light collecting lens 16. Light is emitted toward not only a direction of a front surface but also in various directions. Therefore, the optical sheet 52 with a wide viewing field can be obtained. A shape of the light collecting lens 16 is not limited to the above mentioned shape, and is appropriately selected according to light distribution characteristics needed for a display to be used. For example, a microlens shape, a multi-sided pyramid shape including a three-sided pyramid and a four-sided pyramid, or the like can be selected.

A plurality of ribs 29 are arranged between the optical film 1 and the optical uniform device 25. Rib 29 is arranged as a dot or a line so as to keep a sufficient air layer between the optical film 1 and the optical uniform device 25. For example, the valley part 13 of the light collecting lens 16 corresponds to a line rib 29. Thereby, a reduction in brightness is controlled and An occurrence of moire interference between the rib 29 and the light collecting lens 16 can be prevented.

Figure 15A:
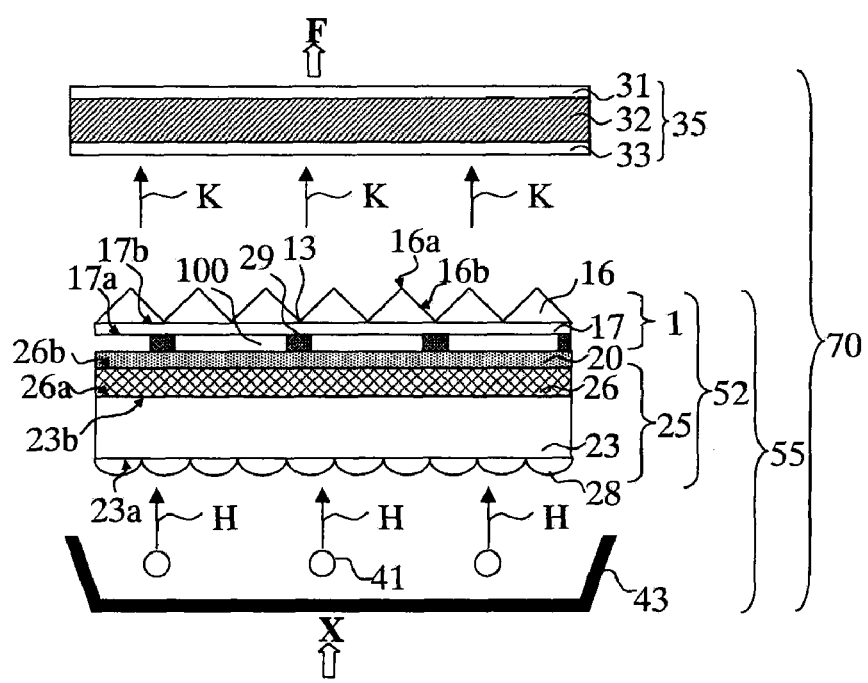
FIG. 15(a) is a schematic cross sectional diagram of a display device of an embodiment of the present invention.
Figure 15B:
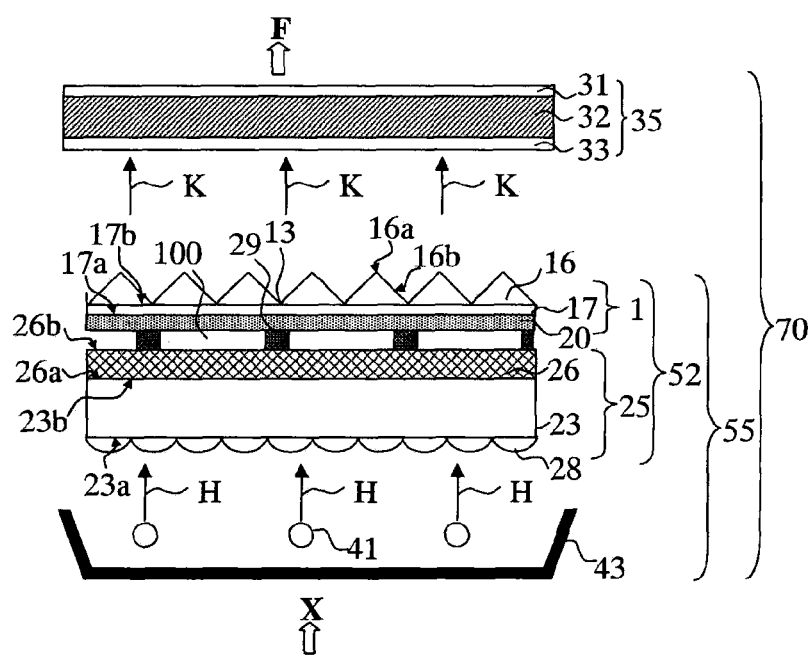
FIG. 15(b) is a schematic cross sectional diagram of a display device of an embodiment of the present invention.

As shown in FIG. 15(a), the rib 29 can be formed on a surface 17a of an opposite side to an observer side of the light transmission base 17 of the optical film 1. In addition, as shown in FIG. 15(b), it can be formed on a surface 26b of an observer side of the diffusion base 26 of the optical uniform device 25.

As shown in FIGS. 14 and 15, a backlight unit 55 of an embodiment of the present invention is a just direct-lit type backlight unit constituted by an optical sheet 52, a plurality of light sources 41 and a reflection plate 43.

In the case where the optical sheet 52 is arranged at an observer side F of the plurality of light sources 41, most of the light H from the light sources can be obtained. Light H enters into the optical sheet 52, and becomes emitted light K. Emitted light K does not have a lamp image of the light source 41 due to a diffusion effect of the optical sheet 52 while its brightness of an observer side F is improved by a light collection effect of the optical sheet 52 when the light is emitted.

Figure 16:
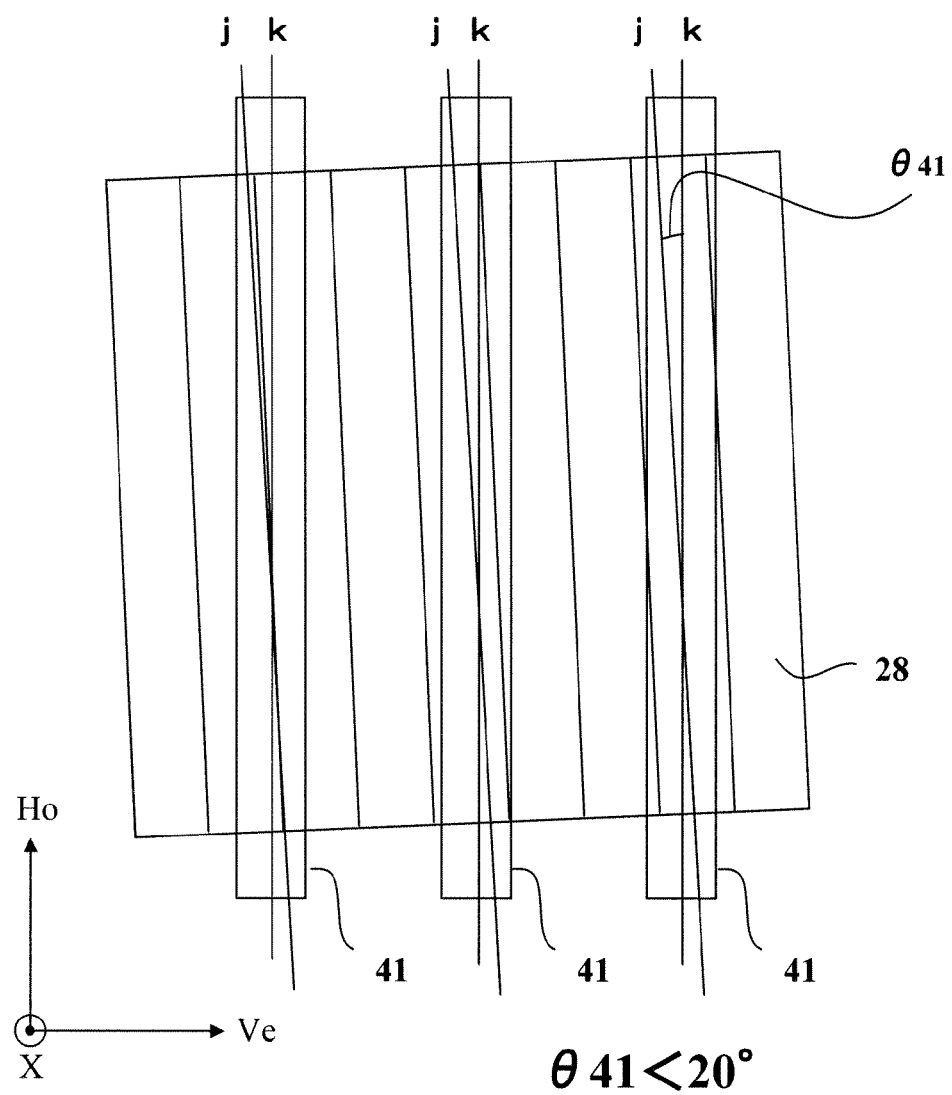
FIG. 16 is a planar view of a backlight unit of an embodiment of the present invention.
Figure 17:
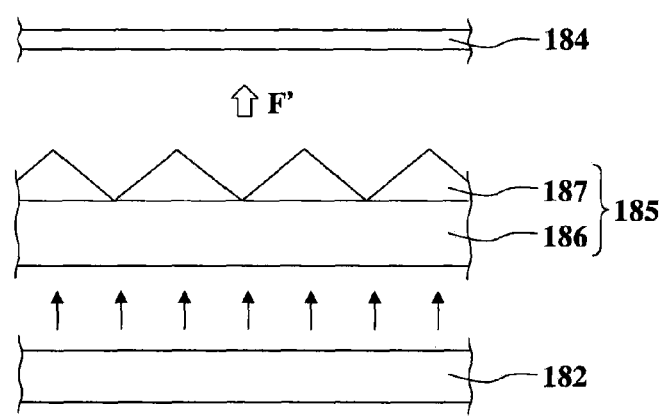
FIG. 17 is a schematic cross sectional diagram showing an example of an arrangement of a BEF.
Figure 18:
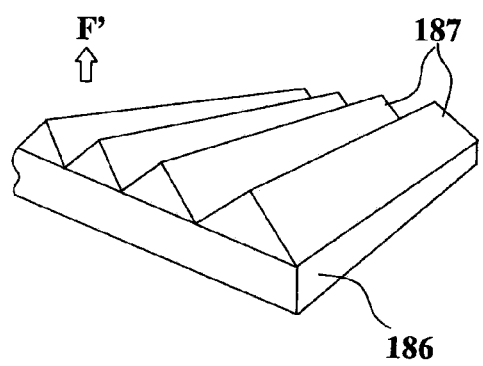
FIG. 18 is a perspective view of a BEF.
Figure 19:
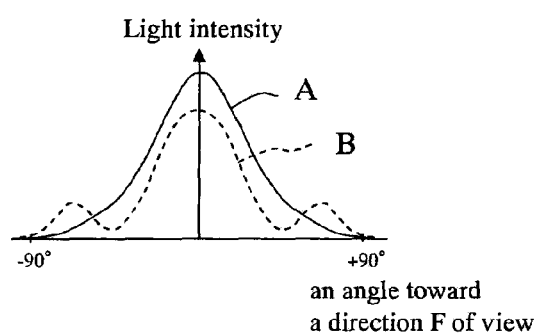
FIG. 19 is a graph showing a relationship between a light intensity and an angle toward a direction of view.

As shown by an arrow X of FIG. 1, FIG. 16 is a schematic plane view when the light source 41 and the light deflection element 28 are viewed from an X direction. The light source 41 is a line shaped light source, and the light deflection element 28 is formed by a lenticular lens.

It is preferable that $\theta_{41}$ between an axis direction j of the light deflection element 28 and an axis direction k of the light source 41 is equal to or less than 20 degrees. In the case where $\theta_{41}$ is equal to or less than 20 degrees, a lamp image of the light source 41 can be removed. On the contrary, in the case where $\theta_{41}$ is more than 20 degrees, reduction of a lamp image of the optical source 41 is not sufficient and a lamp image of the light source 41 may appear in a liquid crystal display screen. In the case where $\theta_{41}$ is 0 degrees, the effect of the light deflection element 28 is largest and therefore it is desirable that $\theta_{41}$ is 0 degrees.

As shown in FIGS. 14 and 15, a display device 70 of an embodiment of the present invention is comprised of an image display device 35 and a backlight unit 50. The image display device 35 is comprised of two polarizing plates (polarizing films) 31, 33, and a liquid crystal panel 32 sandwiched between them. The liquid crystal panel 32 is, for example, constituted such that a liquid crystal layer is arranged between two glass substrates. Light K emitted from the backlight unit 50 enters into the liquid crystal part 32 through the polarizing filter 33, and is emitted toward an observer side F through the polarizing filter 31.

It is preferable that the image display device 35 is a device in which an image is displayed by transmission/shielding of light for a pixel unit. If an image is displayed by transmission/shielding of light for a pixel unit, brightness toward an observer side F is improved by the optical sheet 52, a dependency property of light intensity on a viewing angle is reduced, and furthermore, light in which an lamp image is reduced is effectively utilized, thereby an image with a high image quality can be displayed. It is preferable that the image display device 35 is a liquid crystal display device. A liquid crystal device is a representative device in which an image is displayed by transmission/shielding of light for a pixel unit, image quality can be increased, and manufacturing costs can be reduced compared with other display devices.

In addition, a diffusion film, a prism sheet, a reflective polarizer or the like may be arranged on the display device 70 of an embodiment of the present invention. In this case, image quality can be improved further.

The display device 70 of an embodiment of the present invention has a structure in which the light collecting/diffusion characteristics of light K are improved by the above mentioned optical sheet 52. Therefore, brightness of an observer side F is improved and distribution of light intensity of a viewing angle direction becomes smooth while an image with a reduced lamp image can be displayed in the image display device 35.

The display device 70 of an embodiment of the present invention is the image display device 35 which determines a display image according to transmission/shielding for each pixel unit, and has a structure in which the light collecting/diffusion characteristics of light K improved by the above mentioned backlight unit 55 are utilized. Therefore, brightness of an observer side F can be improved, distribution of light intensity of a viewing angle direction can be smoothed, and an image with a reduced lamp image can be obtained.

In the display device 70 of an embodiment of the present invention, the image display device 35 is a liquid crystal display device, and light K in which light collecting/diffusion characteristics are improved by the above mentioned backlight unit 55 is utilized. Therefore, brightness of an observer side F can be improved, distribution of light intensity of a viewing angle direction can be smoothed, and an image with a reduced lamp image can be obtained.

EFFECT OF THE INVENTION

In the above structure, even if a distance from a light source becomes short, uniform light can be emitted. In a multi-layer structure, if a thickness or a material of respective layers is changed, an optical device and an optical uniform device can be provided, in those devices, warpage due to heat emitted from a light source can be prevented. In addition, if light emitted from an optical device and an optical uniform device is efficiently emitted to an observer side, an optical sheet in which an optical film improving brightness of an observer side and the optical device are combined, a backlight unit and a display device having the optical sheet can be provided.

Hereinafter, the present invention is explained in detail according to an example. In addition, the present invention is not limited to the example.

In this example, firstly, it is observed that a difference of coefficient of thermal expansion of respective layers constituting an optical device 24 influences the warpage of an optical device 24 itself Comparative Example 1

A polycarbonate plate of 1 mm thickness was prepared as a light propagation layer 23. A triangle prism was formed by a ultraviolet shaping method on a polypropylene sheet of 100 µm thickness as a light deflection element 28. It was laminated on a polycarbonate plate of 1 mm thickness by using an adhesive. Thereby an optical device 24 was obtained. Coefficient of thermal expansions of polycarbonate and polypropylene were respectively $7\times10^{-5}$ mm/mm/° C. and $11\times10^{-5}$ mm/mm/° C.

Comparative Example 2

A polycarbonate plate of 1 mm thickness was prepared as the light propagation layer 23. A triangle prism was formed by a ultraviolet shaping method on a stretched polyethylene terephthalate sheet of 100 μm thickness as the light deflection element 28. It was laminated on a polycarbonate plate of 1 mm thickness by using an adhesive. Thereby the optical device 24 was obtained. Coefficients of thermal expansion of polycarbonate and polyethylene terephthalate were respectively $7 \times 10^{-5}$ mm/mm/° C. and $8 \times 10^{-5}$ mm/mm/° C.

Example 1

A polycarbonate plate of 1 mm thickness was prepared as the light propagation layer 23. A triangle prism was formed by a ultraviolet shaping method on a non-stretched polyethylene terephthalate sheet of 100 μm thickness as a light deflection element 28. It was laminated on a polycarbonate plate of 1 mm thickness by using an adhesive. Thereby the optical device 24 was obtained. Coefficients of thermal expansions of polycarbonate and polyethylene terephthalate were respectively $7 \times 10^{-5}$ mm/mm/° C. and $8 \times 10^{-5}$ mm/mm/° C.

The optical device 24 manufactured in Comparative Examples 1-2 and Example 1 was left at 80 degrees Celsius for 24 hours. The state of warpage of the optical device 24 was observed. In Comparative Example 1, coefficient of thermal expansion of polypropylene was equal to or more than 1.5 times as large as the coefficient of thermal expansion of a polycarbonate plate. Therefore, warpage occurred. In Comparative Example 2, coefficient of thermal expansion of a polycarbonate plate was almost the same as the coefficient of thermal expansion of polyethylene terephthalate. However, polyethylene terephthalate was a stretched film, therefore shrinkage and warpage occurred. In Example 1, polyethylene terephthalate was a non-stretched film. Therefore, an excellent optical device 24 without warpage was obtained.

Example 2

A polypropylene film was laminated by using an adhesive on a surface of an observer side of the optical device 24 of a structure of Comparative Example 1. Thereby an optical device 25 was obtained.

Example 3

A stretched white PET film as a diffusion base 26 was laminated by using an adhesive on a surface of an observer side of the optical device 24 of a structure of Comparative Example 2. Thereby the optical uniform device 25 was obtained.

The optical uniform device 25 manufactured in Examples 2-3 was left at 80 degrees Celsius for 24 hours, and their state of warpage of was observed. In Example 2, an excellent optical device 24 without warpage was obtained. In Example 3, an excellent optical uniform device 25 without warpage was obtained.

In this example, it was recognized that an optical device without warpage was obtained by using materials with an almost identical coefficient of thermal expansion. In addition, in the case where a stretched film was used, if a stretched film was used for both surfaces of the optical device 24 and the optical uniform device 25, it was recognized that warpage can be prevented. Hereinafter, the optical characteristics of the display device 70 using the optical uniform device 25 and the optical sheet 52 of the present invention are explained by detailed examples.

A convex lenticular lens was prepared as a light deflection element 28. A pitch P of the convex lenticular lens was 100 μm. Angle θ between a tangential line m at a connection point 30 of a light propagation layer 23 and a convex lenticular lens and a surface 23a of an opposite side to an observer side of the light propagation layer 23 was 65 degrees. A height of the convex lenticular lens was 45 μm. In addition, all of the material of the light deflection lens 28, the light propagation layer 23 and the diffusion base 26 were polycarbonate (refractive index=1.59). The diffusion base 26 included an adequate amount of a resin filler so that all of the light transmittance was 60%, a haze value was 99% and a thickness was 1.5 mm. A transparent material without a resin filler was used for the light propagation layer 23. All of the light transmittance thereof was 87%. In the examples below, samples in which a thickness of the light propagation layer 23 was changed was manufactured.

Comparative Example 3

In the above optical uniform device 25, a thickness of the light propagation layer 23 was adjusted to be 150 μm, and the optical uniform device 25 was manufactured by a multi-layer extrusion method.

Example 4

In the above optical uniform device 25, a thickness of the light propagation layer 23 was adjusted to be 600 μm, and the optical uniform device 25 was manufactured by a multi-layer extrusion method.

Example 5

In the above optical uniform device 25, a thickness of the light propagation layer 23 was adjusted to be 1 mm, and the optical uniform device 25 was manufactured by a multi-layer extrusion method.

A diffusion film, a 90 degrees triangle prism sheet and a diffusion film were arranged in this order on a surface of an observer side F of the optical uniform device 25 manufactured by the above processes. These were arranged above a backlight 56 in which a CCFL space was 18 mm and a distance between CCFL and an optical uniform device 25 was 5 mm. A liquid crystal panel 35 was arranged in an observer side F of the backlight 56. Thereby a display device 70 was obtained.

Next, a convex lenticular lens sheet was prepared as the light deflection element 28. A pitch P of the convex lenticular lens was 100 μm. Angle θ between a tangential line m at a connection point 30 of a light propagation layer 23 and the convex lenticular lens and a surface 23a of an opposite side to an observer side of the light propagation layer 23 was 65 degrees. A height of the convex lenticular lens was 45 μm. The lencicular lens was shaped on a PET base of 75 μm thickness. In addition, the material of the light propagation layer 23 and the diffusion base material 26 were polycarbonate (refractive index=1.59). The diffusion base 26 included an adequate amount of a resin filler so that all of the light transmittance was 60%, a haze value was 99% and a thickness was 1.5 mm. A transparent material without a resin filler was used for the light propagation layer 23. All of the light transmittance thereof was 87%. A thickness thereof was 600 μm.

Example 6

An optical sheet 52 was obtained as follows. An optical film 1 was as follows. A light collecting lens 16 with 150 μm pitch was arranged on a PET base of 75 μm thickness. A region of a light mask 22 was 50% of a pitch of the light collecting lens 16. The optical film 1 was attached using an adhesive to a surface of an observer side F of the optical uniform device 25 manufactured by the above process, in order to form one body of the optical sheet 52.

Example 7

A diffusion film, a 90 degrees triangle prism sheet and a diffusion film were arranged in this order on a surface of an observer side F of the optical uniform device 35 manufactured by the above process.

Example 8

An optical film was as follows. A 90 degrees triangle prism was shaped on a PET base of 75 μm thickness. A dot shaped rib 29 of 50 μm×50 μm size was formed on a surface of the PET base, the surface of which facing a 90 degrees triangle prism. The optical film 1 was attached using an adhesive to a surface of an observer side F of the optical uniform device 25 manufactured by the above process, in order to form one body of the optical sheet 52.

Samples manufactured by the above processes in Examples 3-5 were arranged above a backlight 56 in which a CCFL space was 18 mm and a distance between a CCFL and an optical uniform device 25 was 5 mm. A liquid crystal panel 35 was arranged in an observer side F of a backlight 56. Thereby a display device 70 was obtained.

Next, a curved triangle prism was manufactured by an extrusion method as a light deflection element 28 by the following method. Polycarbonate was used as a material. Pitch P was 100 μm. An angle θ between a tangential line 1 at a connection point 30 with a light propagation layer 23 and surface 23a of an opposite side to an observer side of a light propagation layer 23 was 65 degrees. Height of the curved triangle prism was 55 μm. Thickness of the curved triangle prism sheet was 200 μm. In addition, the light propagation layer 23 and the diffusion base 26 was polystyrene (refractive index=1.59). The light propagation layer 23 was a transparent material without a resin filler, a thickness of the layer 23 was 0.6 μm, and all of the light transmittance was 89%. Hereinafter, samples were manufactured in the Examples. In the samples, total luminous transmittance and haze values of the diffusion base 26 were changed by adjusting an amount of a diffusion particle constituting the diffusion base 26.

Comparative Example 4

In the above optical uniform device 25, the diffusion base material 26 was manufactured so that total luminous transmittance thereof was 25%, haze value thereof was 99%, and a thickness thereof was 2 mm.

Example 9

In the above optical uniform device 25, the diffusion base material 26 was manufactured so that total luminous transmittance thereof was 70%, haze value thereof was 99%, and a thickness thereof was 1 mm.

Comparative Example 5

In the above optical uniform device 25, the diffusion base material 26 was manufactured so that total luminous transmittance thereof was 70%, haze value thereof was 90%, and a thickness thereof was 0.5 mm.

An optical sheet 52 was obtained as follows. An optical film 1 was as follows.

A light collecting lens 16 with 150 μm pitch was arranged on a PET base of 75 μm thickness. A region of a light mask 22 was 50% of a pitch of the light collecting lens 16. The optical film 1 was attached using an adhesive to a surface of an observer side F of the optical uniform device 25 manufactured by the above process, in order to form one body of the optical sheet 52. The obtained optical sheet 52 was arranged above a backlight 56 in which a CCFL space was 18 mm and a distance between CCFL and the optical uniform device 25 was 5 mm. A liquid crystal panel 35 was arranged in an observer side F of the backlight 56. Thereby a display device 70 was obtained.

(Optical Evaluation)

A display device of the Examples and Comparative Examples was evaluated according to the following measuring methods.

(Front Brightness Evaluation)

A display device 70 was displayed so that the entire screen was white. A center part of the screen was measured by a spectral-radiance measurer (SR-3A: a product of TOPCON TECHNOHOUSE CORPORATION).

(Brightness Uniformity Evaluation)

The display device 70 was displayed so that the entire screen was white. The entire screen was measured by a brightness uniformity measurer (ProMetric 1200: a product of Radiant Imaging). Analysis was performed using brightness distribution data of a direction perpendicular to the arrangement of a plurality of cold-cathode tubes. In addition, a wave shaped distribution corresponding to cold-cathode tubes are obtained as a brightness distribution. Brightness data corresponding to five cold-cathode tubes arranged in a center part was used and an average brightness was calculated. Then, a brightness change (%) with respect to the average brightness was calculated. If a standard deviation of this brightness change was within 1%, a diffusion property of an optical sheet was determined as "OK".

Table 1 shows measured results of Examples and Comparative Examples.

TABLE 1

|  | Brightness [cd/m$^2$] | Brightness uniformity | warpage | determination |
|---|---|---|---|---|
| Comparative Example 3 | 430 | NG | ○ | NG |
| Example 4 | 425 | OK | ○ | OK |
| Example 5 | 420 | OK | ○ | OK |
| Example 6 | 470 | OK | ⊚ | OK |
| Example 7 | 430 | OK | ○ | OK |
| Example 8 | 415 | OK | ⊚ | OK |
| Comparative Example 4 | 350 | OK | ○ | NG |
| Example 9 | 480 | OK | ○ | OK |
| Comparative Example 5 | 490 | NG | Δ | NG |

In Comparative Example, there were no problems in both brightness and warpage. However, since the light propagation layer 23 was too thin, a light source image could not be perfectly removed, thereby a determination was NG In Example 4, there were no problems in both brightness and warpage. A light source image was removed. (OK determination) In Example 5, there were no problems in both brightness and warpage. A light source image was removed. (OK determination) In Example 6, brightness was high and warpage rarely occurred. (OK determination) In Example 7, a small warpage occurred in the light source 41 side. However, it was equal to or less than 5 mm. Therefore, it was not a problem when it was actually used. (OK determination) In Example 8, brightness was slightly reduced compared with the samples of other Examples. However, sufficient brightness was obtained. (OK determination) In Comparative Example 4, there was no problem in warpage, and a light source image was removed. However, total luminous transmittance of the diffusion base 26 was too low, therefore brightness reduction was remarkable. NG determination. In Example 9, brightness was high and there was no problem in warpage (OK determination). In Comparative Example 5, brightness was too high. However, a haze value of the diffusion base 26 was too low, therefore a light source image could not be perfectly removed. NG determination.

The invention claimed is:

1. A liquid crystal display device comprising:
a line shaped light source; and
an optical uniformity device comprising:
   a light deflection lens having a lens shape of a lenticular type, wherein, in planar view, an angle between a direction of a long axis of the light deflection lens and a direction of a long axis of the line shaped light source is equal to or less than 20 degrees;
   a light propagation layer located at a light outgoing surface side of the light deflection lens, wherein light deflected by the light deflection lens enters into the light propagation layer; and
   a light diffusion base arranged at the light outgoing surface side of the light propagation layer,
wherein
the light deflection lens comprises a top part and a slope part, where the slope part is from the top part onto a surface of the light propagation layer on a side of the line shaped light source,
the top part comprises an arc or a tip that forms a ridge line of which a curvature radius is smaller than a curvature radius along the slope part, and
a thickness T of the light propagation layer satisfies the following formula 1, and wherein
n is the refractive index of the light propagation layer,
P is the pitch of the light deflection lens, and
θ is an angle between
   a tangential line to the slope part at a junction point to the light propagation layer, and
   the surface of the light propagation layer on the side of the line shaped light source $$T > P \times \tan\left\{\mathrm{Sin}^{-1}\left(\frac{1}{n}\sin\theta\right) + \mathrm{Cos}^{-1}(\sin\theta)\right\} \quad \text{(formula 1)}$$

$$(10 \ \mu\mathrm{m} \leq P \leq 300 \ \mu\mathrm{m}).$$

2. The liquid crystal display device according to claim 1, wherein, regarding the optical uniformity device,
the light diffusion base is formed by a light diffusion region dispersed in a transparent resin, the light diffusion base having a total luminance transmittance value within 30% to 80% and a haze value equal to or greater than 95%; and
the light propagation layer has a total luminance transmittance value equal to or greater than 80%, and a haze value equal to or less than 95%.

3. The liquid crystal display device according to claim 1, wherein, regarding the light deflection lens,
the slope part has a curved shape that includes a curved slope part,
an angle between
   a tangential line at each point of the curved slope part and
   the surface of the light propagation layer on the side of the line shaped light source
is within 20 to 90 degrees, and
the angle, between the tangential line at each point and the surface of the light propagation layer, changes continuously.

* * * * *